US008769216B2

(12) United States Patent
Fossum

(10) Patent No.: US 8,769,216 B2
(45) Date of Patent: *Jul. 1, 2014

(54) OPTIMIZING OUTPUT VECTOR DATA GENERATION USING A FORMATTED MATRIX DATA STRUCTURE

(75) Inventor: Gordon Clyde Fossum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/455,493

(22) Filed: Apr. 25, 2012

(65) Prior Publication Data
US 2012/0210081 A1    Aug. 16, 2012

Related U.S. Application Data

(63) Continuation of application No. 12/961,033, filed on Dec. 6, 2010.

(51) Int. Cl.
*G06F 12/00*    (2006.01)
*G06F 13/00*    (2006.01)

(52) U.S. Cl.
USPC .......................................... 711/154; 711/100

(58) Field of Classification Search
CPC ..... G06F 12/0284; G06F 13/00; G06F 13/14; G06F 13/1652
USPC ................................................ 711/100, 154
See application file for complete search history.

(56) References Cited

U.S. PATENT DOCUMENTS

| 5,267,185 | A | 11/1993 | Akabane et al. |
| 5,781,779 | A | 7/1998 | Gilbert et al. |
| 6,397,236 | B1 | 5/2002 | Garg et al. ..................... 708/446 |
| 6,470,441 | B1 * | 10/2002 | Pechanek et al. ............... 712/15 |
| 6,769,056 | B2 * | 7/2004 | Barry et al. ...................... 712/15 |
| 2007/0198621 | A1 | 8/2007 | Lumsdaine et al. .......... 708/200 |
| 2008/0082790 | A1 | 4/2008 | Diyankov et al. ............. 712/207 |
| 2008/0126467 | A1 | 5/2008 | Ghuloum |
| 2010/0306300 | A1 | 12/2010 | Lu et al. |
| 2010/0325187 | A1 | 12/2010 | Juffa et al. |

FOREIGN PATENT DOCUMENTS

WO    WO 2009/037684    3/2009    ............. G06F 17/16

OTHER PUBLICATIONS

Li et al., "GPU-Accelerated Preconditioned Iterative Linear Solvers," Research Report UMSI 2010/112 Computer Science and Engineering, University of Minnesota, Minneapolis, MN, Oct. 2012, pp. 1-24.
Sun et al., "Mapping Sparse Matrix-Vector Multiplication on FPGAs," Proceedings of the Third Annual Reconfigurable Systems Summer Institute (RSSI '07), Jul. 2007, Urbana, IL, pp. 1-10.

(Continued)

*Primary Examiner* — Tuan Thai
(74) *Attorney, Agent, or Firm* — VanLeeuwen & VanLeeuwen; Matthew W. Baca

(57) ABSTRACT

A computer system retrieves a packet that includes non-zero elements that correspond to sparse-matrix rows. Within the packet, the non-zero elements are stored in predefined fields that each correspond to one of the sparse-matrix rows. The computer system computes output values to correspond with each of the sparse-matrix rows using the non-zero elements and corresponding input values. In turn, the computer system stores the computed output values in consecutive locations within an output buffer and processes the output values accordingly.

7 Claims, 19 Drawing Sheets

(56) References Cited

OTHER PUBLICATIONS

Monakov et al., "Automatically Tuning Sparse Matrix-Vector Multiplication for GPU Architectures," Jan. 2010, High Performance Embedded Architectures and Compilers, Springer Berlin Heidelberg, pp. 111-125.
Bell et al., "Efficient Sparse Matrix-Vector Multiplication on CUDA," NVIDIA Technical Report NVR-2008-004, NVIDIA Corporation, Dec. 2008, pp. 1-32.
Fossum, "Sparse Matrix-Vector Multiplication," in "OpenCL Programming Guide," Jul. 2011, Eddison-Wesley Professional, pp. 515-539.
International Search Report for Application No. PCT/EP2011/071359, mailed Nov. 28, 2012, 16 pages.
Strout et al., "Rescheduling for Locality in Sparse Matrix Computations," University of California San Diego, Oct. 2001, 10 pages.
Ng, Esmond, "Direct Methods for Solving Sparse Linear Systems of Equations," Lawrence Berkely National Laboratory, Oct. 2002, 49 pages.
Davis et al., "The University of Florida Sparse Matrix Collection," ACM Transactions on Mathematical Software, Mar. 2010, pp. 1-28.
"OpenCL™ Optimization Case Study: Diagonal Sparse Matrix Vector Multiplication," Advanced Micro Devices, Inc., 2010, 8 pages.
Office Action for U.S. Appl. No. 12/961,033 (Fossum, "Optimizing Output Vector Data Generation Using A Formatted Matrix Data Structure ," filed Dec. 6, 2010), United States Patent and Trademark Office, mailed Oct. 15, 2013, 27 pages.
Notice of Allowance for U.S. Appl. No. 12/960,963 (Fossum, "Data Structure for Tiling and Packetizing a Sparse Matrix," filed Dec. 6, 2010), United States Patent and Trademark Office, mailed Nov. 5, 2013, 12 pages.

\* cited by examiner

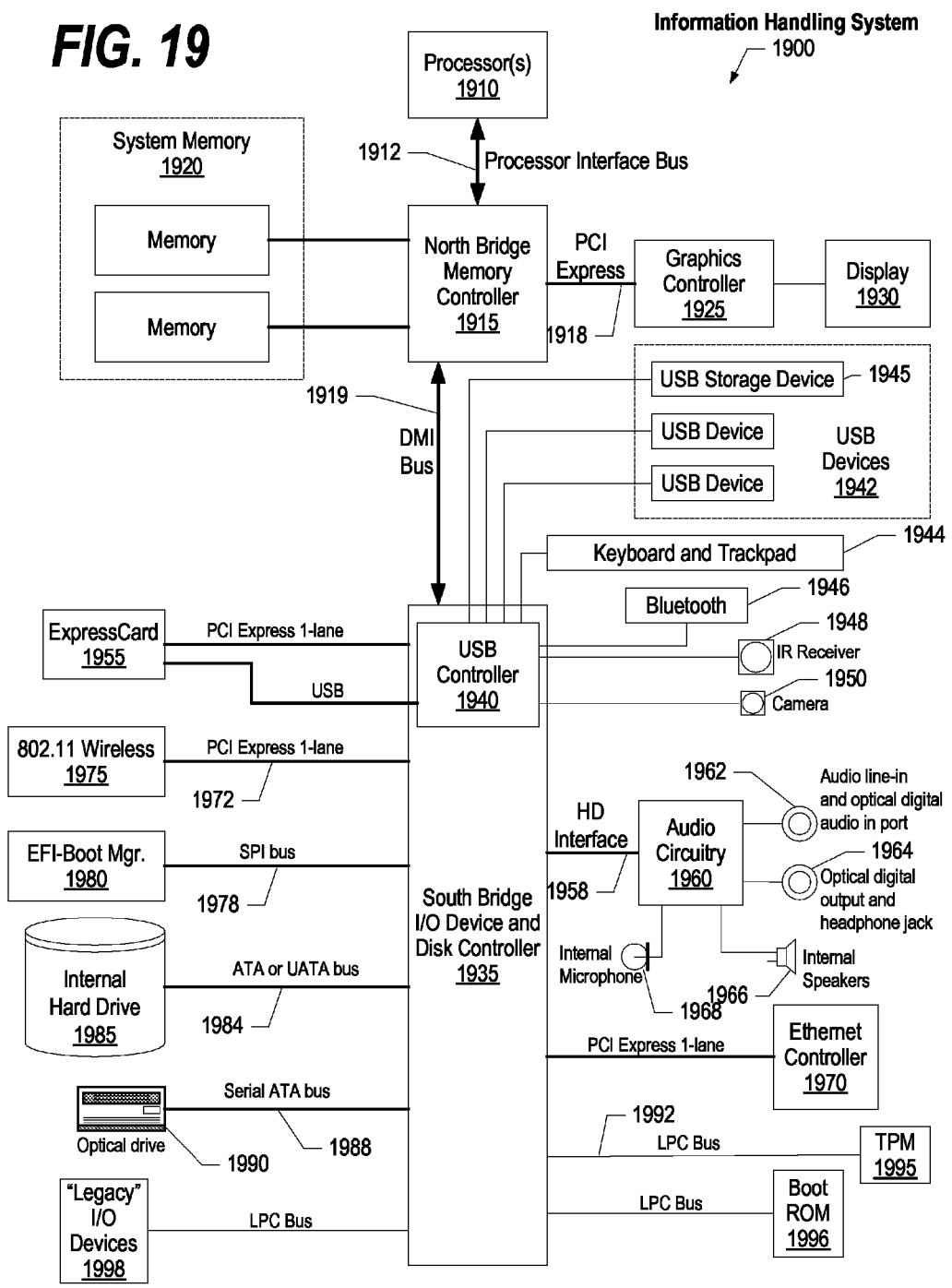

OPTIMIZING OUTPUT VECTOR DATA GENERATION USING A FORMATTED MATRIX DATA STRUCTURE

RELATED APPLICATION

This application is a continuation of U.S. application Ser. No. 12/961,033, filed Dec. 6, 2010, titled "Optimizing Output Vector Data Generation Using A Formatted Matrix Data Structure," and having the same inventor as the above-referenced application.

TECHNICAL FIELD

The present disclosure relates to efficiently computing output vector values from sparse matrix data and input vector values. More particularly, the present disclosure relates to using a formatted matrix data structure to block write output vector values to an output vector during sparse matrix computations.

BACKGROUND

A sparse matrix typically includes a very large amount of elements (e.g., bytes). Some of these elements include values and are coined "non-zero elements. A large percentage of the elements, however, include zeros (or no values at all), thus, the term "sparse" matrix. Conceptually, sparsity corresponds to systems which are loosely coupled.

A "matrix" may be defined as a two-dimensional array of numerical values. If a preponderance of these values is zero, the matrix may be considered a "sparse matrix." Conceptually, when a matrix is sparse, the system it represents is "loosely coupled." Huge sparse matrices often appear in science or engineering when solving partial differential equations. For example, sparse matrices may be used in applications with underlying 2D or 3D geometry (such as structural engineering, computational fluid dynamics, model reduction, electromagnetics, semiconductor devices, thermodynamics, materials, acoustics, computer graphics/vision, robotics/kinematics, and other discretizations). Sparse matrices may also be used in applications that typically do not have such geometry (such as optimization, circuit simulation, economic and financial modeling, theoretical and quantum chemistry, chemical process simulation, mathematics and statistics, power networks, and other networks and graphs).

SUMMARY

A computer system retrieves a packet that includes non-zero elements that correspond to sparse-matrix rows. Within the packet, the non-zero elements are stored in predefined fields that each correspond to one of the sparse-matrix rows. The computer system computes output values to correspond with each of the sparse-matrix rows using the non-zero elements and corresponding input values. In turn, the computer system stores the computed output values in consecutive locations within an output buffer and processes the output values accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 19 is a diagram showing another example of a computer system capable of performing the computing operations described herein.

DETAILED DESCRIPTION

Figure 1:
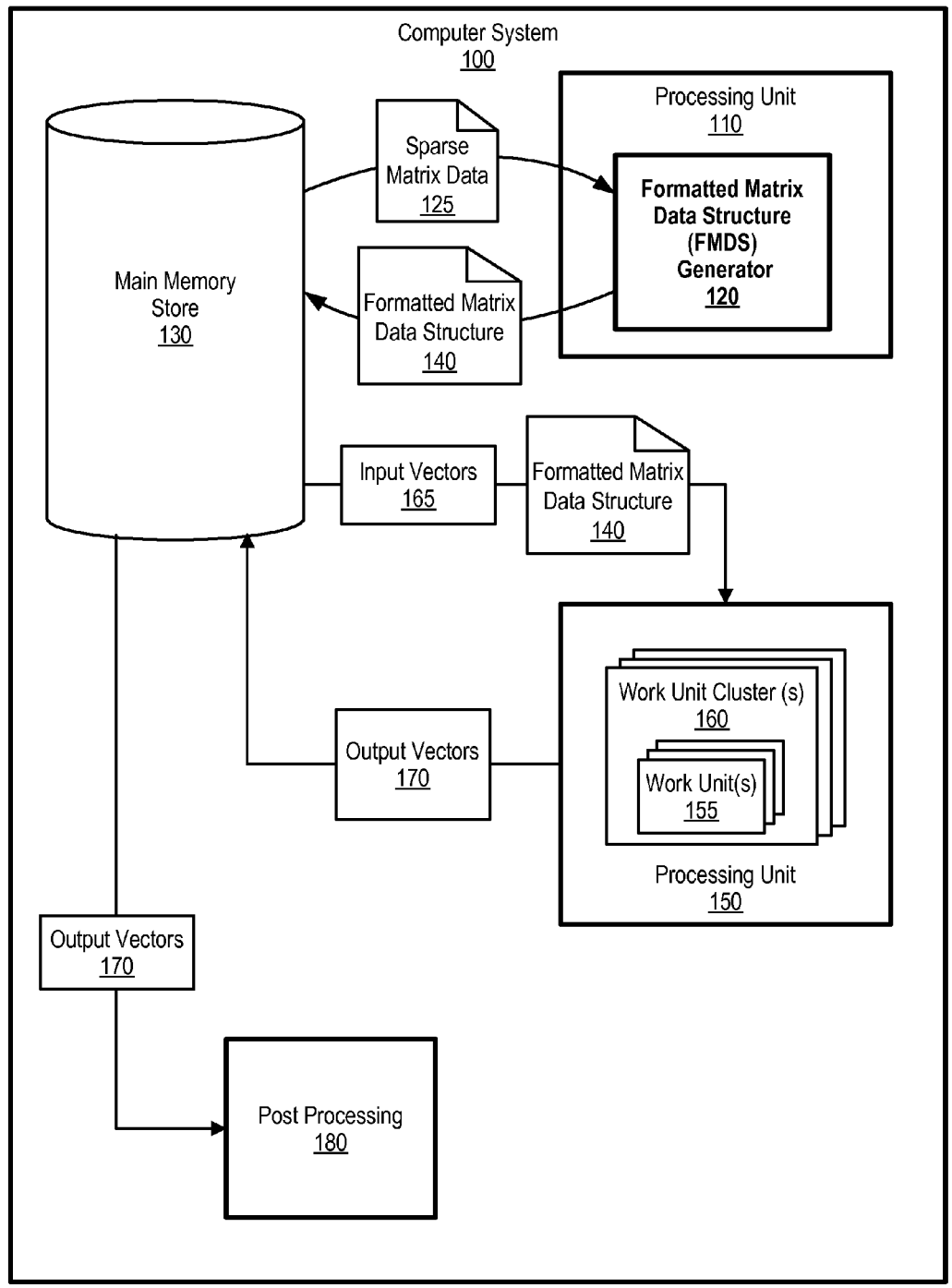
FIG. 1 is a diagram showing a computer system creating a formatted matrix data structure (FMDS) and subsequently multiplying the FMDS by input vectors to efficiently generate output vector data.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer executable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a computer system creating a formatted matrix data structure (FMDS) and subsequently multiplying the FMDS by input vectors to efficiently generate output vector data. Computer system 100 uses sparse matrix data to create a formatted matrix data structure that improves vector processing performance. In one embodiment, the sparse matrix is substantially large and highly reused for vector multiplications (e.g., imaging applications). As such, computer system 100 reorganizes the sparse matrix data into a convenient device-independent formatted matrix data structure in order to improve performance across multiple hardware platforms.

Computer system 100 includes processing unit 110, such as a general purpose processing unit, a graphical processing unit (GPU), or other type of processing unit that has the ability to perform steps as discussed herein. Processing unit 110 includes formatted matrix data structure (FMDS) generator 120, which may be a software application executing on processing unit 110, hardware-based logic residing on processing unit 110, or a combination of hardware-based logic and software application.

FMDS generator 120 retrieves sparse matrix data 125 from main memory store 130. Sparse matrix data 125, for example, may be in a market matrix (MM) format. In one embodiment, FMDS generator 120 converts sparse matrix data 125 from the MM format to a compressed sparse row (CSR) array format (see FIG. 9A and corresponding text for further details). FMDS generator 120 proceeds to partition the sparse matrix data 125 into "slabs" and "tiles." Each slab spans the width of the sparse matrix and includes multiple tiles. Each tile includes a particular number of element "rows," which includes a number of "elements." In addition, FMDS generator 120 groups the element rows into "slices." The number of rows within a slice corresponds to the vector multiplication architecture of processing unit 150. This disclosure assumes that the number of work units 155 (e.g., hardware threads, or kernels) included in a work unit cluster 160 (e.g., group of hardware threads, or kernels) is sixteen (half-warp processing). As those skilled in the art can appreciate, more or less work units may be grouped into clusters that what is discussed herein.

Once FMDS generator 120 generates packets from sparse matrix data 125, FMDS generator 120 stores the packets in formatted matrix data structure 140 according to slab location, tile location, and slice location. In addition, FMDS generator 120 stores data structure header information in formatted matrix data structure 140 that identifies slab offset information, placket start location information, and other information pertaining to the packets included in each slab (see FIG. 7 and corresponding text for further details). In one embodiment, FMDS generator 120 stores FMDS 140 back into main memory 130 for subsequent retrieval and use by processing unit 150.

Processing unit 150 may be, for example, a general purpose processing unit or graphical processing unit. In one embodiment, processing unit 110 and processing unit 150 may be the same device, or the same type of device. Processing unit 150 includes work units 115 (e.g., hardware threads or kernels), which are organized into work unit clusters 160. As discussed earlier, this disclosure assumes that each of work unit clusters 160 includes 16 work units 155 in order to process data in a "half-warp" manner.

Processing unit 150 retrieves FMDS 140 and input vectors 165. Processing unit 150 multiplies input vectors 165 with FMDS 140 to create output data. As such, due to the organizational structure of FMDS 140, processing unit 150 is able to efficiently "block write" the output data directly into output vectors 170 (minimizing scattering operations) and store output vectors 170 in main memory 130. In turn, post processing 180 retrieves output vectors 170 and processes the output data accordingly (see FIG. 17 and corresponding text for further details).

In one embodiment, processing unit 150 uses a Sparse Matrix-Vector Multiplication (SpMV) algorithm with an Open Computing Language (OpenCL). This embodiment may use OpenCL kernel code that may be compiled and executed on a conforming OpenCL platform. In turn, this embodiment, provides a portable data format that includes, for example, single precision or double precision floating point numbers, and bridges the gap between hardware specific code (fast, but not portable), and single-source code (portable, but inefficient).

In another embodiment, an OpenCL application includes two components, which are a "host" code, which executes on a general purpose processor, and a "kernel" code, which runs on computational units. In this embodiment, an OpenCL API includes a set of query functions to determine the type of compute devices available on the platform; how many individual compute units are available; and the size of each compute unit's local memory (e.g., the memory that is "close" to the compute units). This allows a system to adaptively determine how to optimize the size and shape of large data structures (e.g., size and shape of tiles).

In another embodiment, a first kernel implements read/write direct access to global memory serially with the computations on that data. The first kernel may be best executed by an OpenCL CPU or GPU device. Within this kernel, an "if-test" is used to distinguish between GPUs which have an innate n-way parallelism in their architecture, and CPUs. The CPU devices synthesize this n-way parallelism with a loop over each of the local work-group items. As such, this embodiment employs a concept of a "cluster" of work units, which has a size of sixteen for a GPU, and a size of 1 for a CPU. To avoid "race conditions" when writing to the local output buffer, each "cluster" of work units on a GPU has its own local buffer to write to, until the matrix is entirely processed, at which point the disparate local buffers are accumulated, and the final result is written back out to the output vector. In this embodiment, a second kernel may use OpenCL's async_work_group_copy built-in function to implement double-buffered reads and writes of data between "distant" global memory and "close" local memory.

Figure 2:
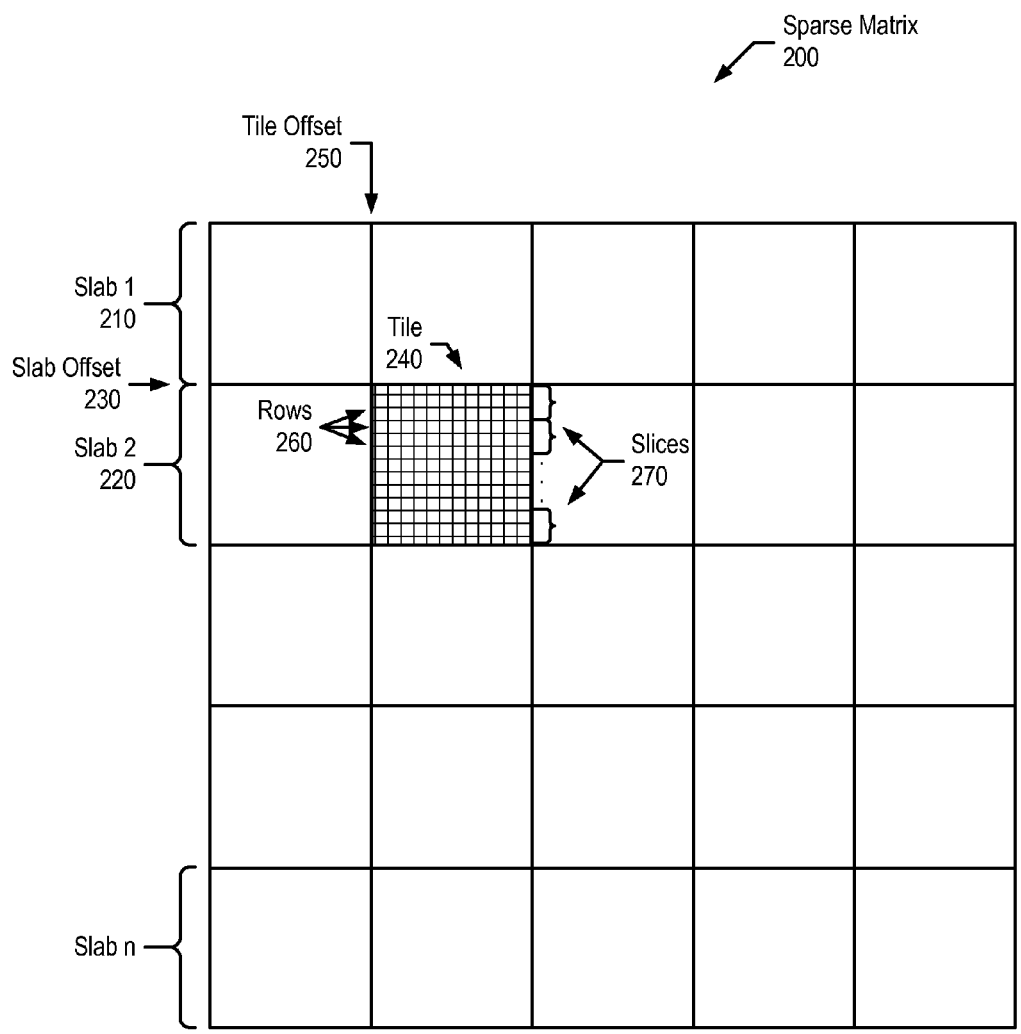
FIG. 2 is a diagram showing a sparse matrix partitioned into slabs and tiles.

FIG. 2 is a diagram showing a sparse matrix partitioned into slabs and tiles. Sparse matrix 200 is a large matrix of data that is sparsely populated with non-zero element values (e.g., non-zero bytes). A formatted matrix data structure (FMDS) generator identifies slab boundaries and tile widths for which to partition sparse matrix 200 (see FIG. 11 and corresponding text for further details). The FMDS generator then divides the tiles into "slices" (slices 270), which include a particular number of rows 260. As discussed in FIG. 1, the number of rows per slice corresponds to the number of work units per work unit cluster in order to achieve subsequent maximum vector multiplication efficiency.

Each slab corresponds to a "slab offset," which identifies the first row included in the slab. As such, each tile within the slab also corresponds the same slab offset and identifies the first row within each of the slab's tiles. FIG. 2 shows that tile 240's slab offset is slab offset 230, which corresponds to the first of rows 260. The FMDS generator includes the slab offset of each slab in the FMDS data structure header (see FIG. 7 and corresponding text for further details).

Each tile also corresponds to a "tile offset," which identifies the first element location (e.g., vertical byte location) included in the particular tile. FIG. 2 shows that tile 240's tile offset is tile offset 250. The FMDS generator includes the tile offset of a particular tile in each packet that is generated for the particular tile (see FIGS. 5-6 and corresponding text for further details). In addition, the FMDS generator includes a "slice offset," corresponding to each slice (slices 270), in each packet header that is generated for a particular slice (see FIGS. 3, 5-6, and corresponding text for further details).

Figure 3:
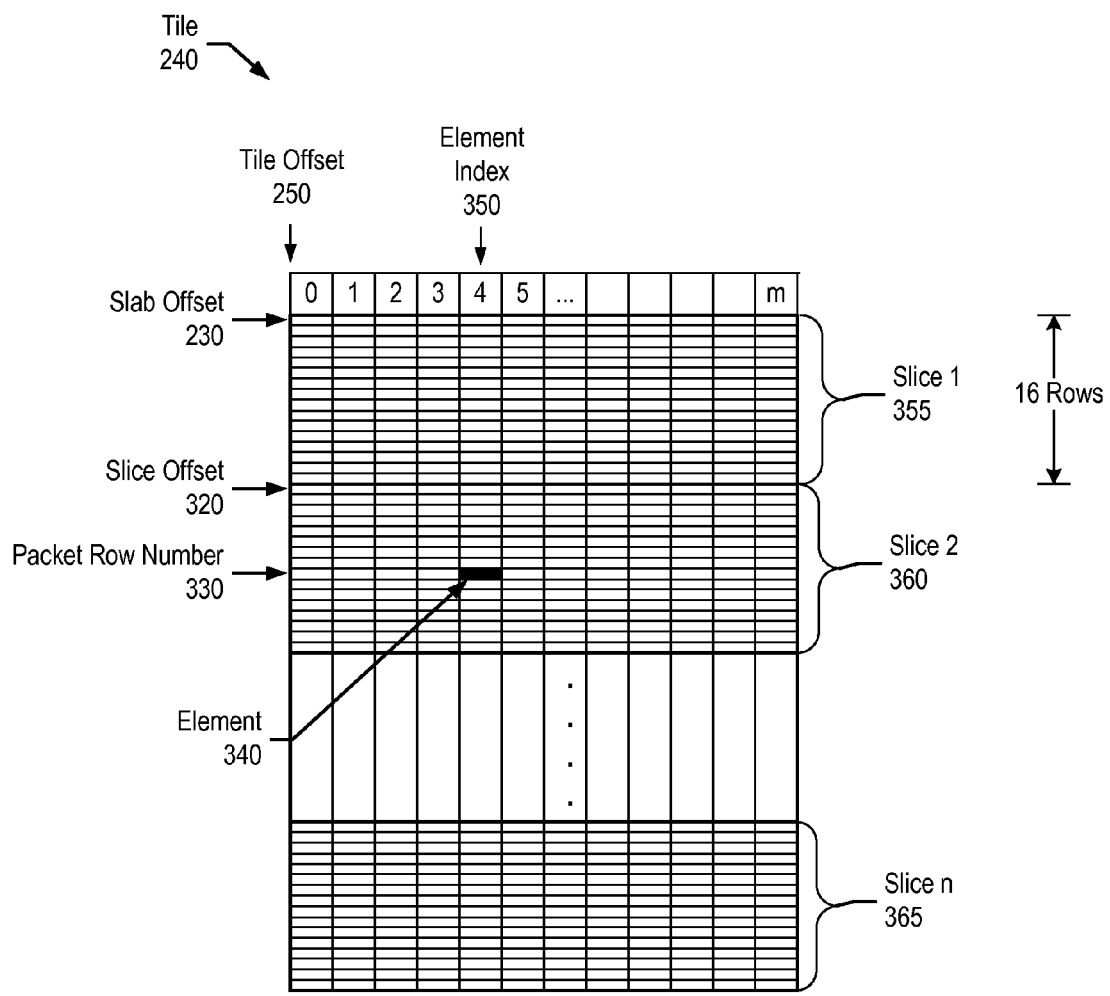
FIG. 3 is a diagram showing a tile that is partitioned into slices.

FIG. 3 is a diagram showing a tile that is partitioned into slices. Tile 240 is the same as that shown in FIG. 2, and is part of sparse matrix 200. Tile 240 includes multiple slices and each slice includes multiple rows. As discussed herein, the number of rows per slice corresponds to the number of work units in a work unit cluster as shown in FIG. 1. The embodiment shown in FIG. 3 shows that each slice includes 16 rows and "M" number of elements.

Tile 240 corresponds to tile offset 250 and, as such, each packet that the FMDS generator creates from non-zero elements included in tile 240 will include tile offset 250 in its packet header. The FMDS generator also identifies a "slice offset" for each slice within each tile, which corresponds to the first row of each slice. FIG. 3 shows that slice 2 360 has a slice offset of 320. In turn, the FMDS generator includes slice offset 320 for each packet corresponding to non-zero elements (e.g., element 340) included in slice 2 360 (see FIGS. 5, 6, and corresponding text for further details).

In one embodiment, the FMDS generator begins at the first slice within a tile to identify non-zero elements and create packets. In one embodiment, the FMDS generator begins by creating packets for slice 1 355, and then creates packets for slice 2 360. Once the FMDS generator creates packets for slice n 365, the FMDS generator selects the next tile in the same slab and starts creating packets for the next tile's first slice. Once the FMDS generator reaches the end of a particular slab, the FMDS generator selects the next slab and starts creating packets for the next slab's first slab.

In one embodiment, the FMDS generator includes two pieces of data information for each non-zero element. The first piece of data information is the non-zero element's "element index," which identifies the location of the non-zero element within a row. The second piece of data information is the non-zero element's "element value," which is the actual value of the non-zero element. The FMDS generator stores the element index and the element value in row-dependent, predefined fields within a packet. For example, element 340 is located in the $9^{th}$ row of slice 2 at the $4^{th}$ element index location. Assuming the value of element 340 is "6," the FMDS generator includes a "4" in the predefined element index field corresponding to the $9^{th}$ row, and includes a "6" in the predefined element value field corresponding to the $9^{th}$ row (see FIGS. 5-6, 8-9, and corresponding text for further details).

Figure 4A:
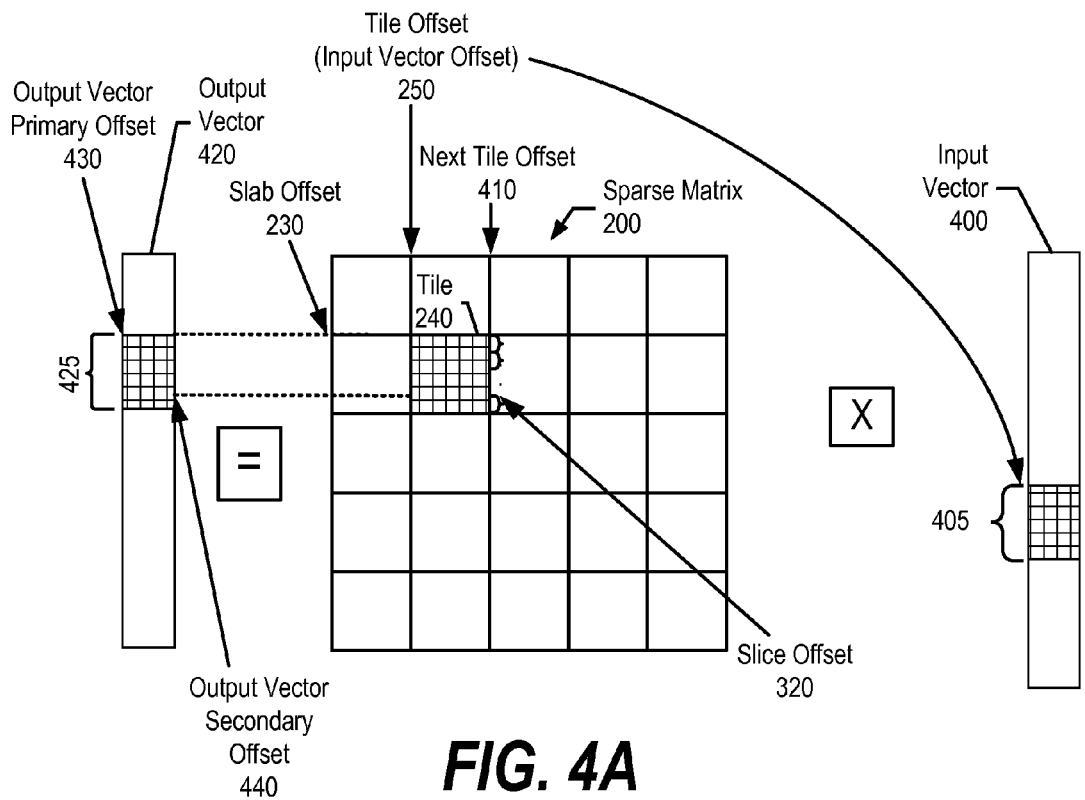
FIG. 4A is a diagram showing a sparse matrix multiplied by an input vector to generate output vector data.

FIG. 4A is a diagram showing a sparse matrix multiplied by an input vector to generate output vector data. By organizing sparse matrix data into a formatted matrix data structure as disclosed herein, a processing unit executes a sparse matrix-vector multiplication (SpMV) algorithm that multiplies the sparse matrix by an input vector to produce output data (e.g., y=A*x) that is the processing unit "block writes" to an output vector (see FIG. 15 and corresponding text for further details). As a result, the processing unit improves cache utilization and minimizes "gather/scatter" inefficiency.

Sparse matrix 200 (complete with all of the "zero elements") is partitioned into slabs whose width spans the entire width of the matrix, and whose height corresponds to a contiguous segment of an output vector (output vector 420). Each tile within the slabs corresponds to an appropriately large contiguous segment (e.g., segment 405) of input vector 400. FIG. 4A also shows the relationship between sparse matrix offsets, input vector offsets, and output vector offsets. Tile offset 250 corresponds to an input vector offset that includes input data that is multiplied by matrix data included in tile 240. Slab offset 230 and slice offset 320 correspond to output vector primary offset 430 and output vector secondary offset 440, respectively, to which output data is written for a particular slice within tile 240.

Figure 4B:
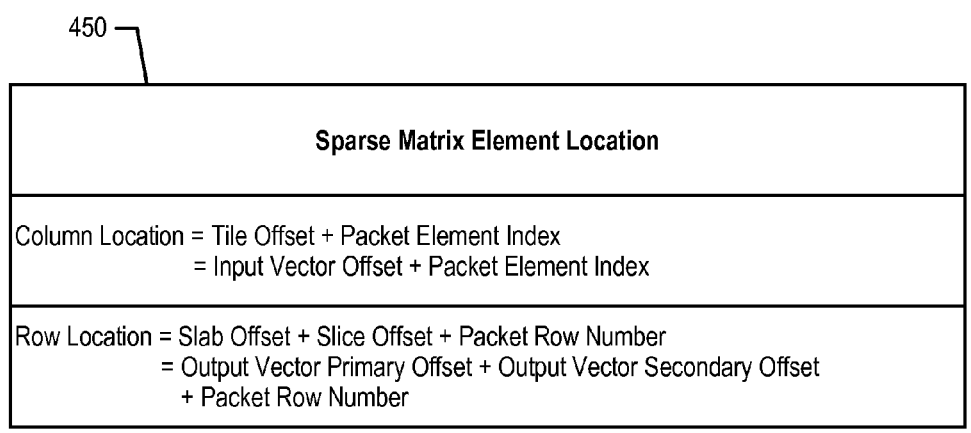
FIG. 4B is a table (table 450) showing computations to identify non-zero element locations within a sparse matrix.

FIG. 4B is a table (table 450) showing computations to identify non-zero element locations within a sparse matrix. In one embodiment, a non-zero element's column location offset equals its tile offset (input vector offset) plus its packet element index. The non-zero element's row location equates to its slab offset plus slice offset plus packet row number, which is the same as the output vector primary offset plus the output vector secondary offset plus the packet row number.

Figure 5:
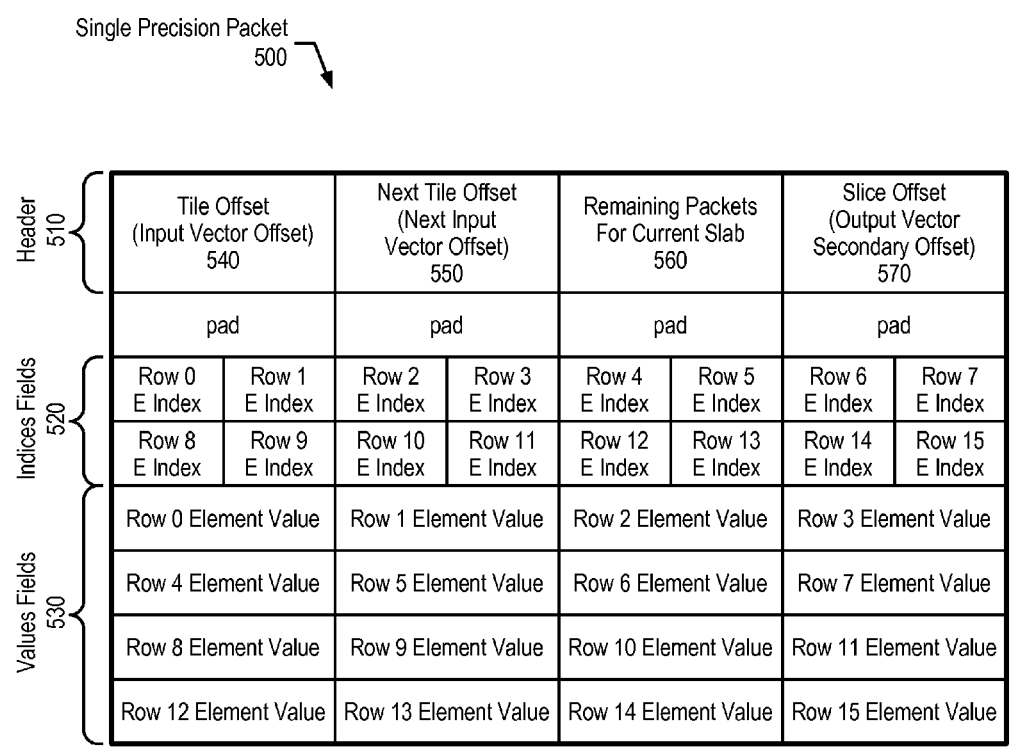
FIG. 5 is a diagram showing a packet generated by a FMDS generator for single-precision operations.

FIG. 5 is a diagram showing a packet generated by a FMDS generator for single-precision operations. Single precision packet 500 is 128 bytes long and includes header 510, indices fields 520, and values fields 530. Indices fields 520 include a predefined field for each row within a selected slice. For example, if the second row of a slice has a non-zero value in element index 9, the FMDS generator stores a "9" in the index field that is predefined to row 2. The example in FIG. 5 shows that single precision packet 500 includes 16 indices fields, one for each row included in one slice, which corresponds to the number of work units assigned to a work unit cluster.

The sparse matrix data is organized into packets in such a manner in order to guarantee that elements in the packet correspond to consecutive rows of the matrix. As such, a single block write of computed results serves to update an output vector of the target of the computations involving the sparse matrix. In addition, this eliminates the need to have 16 separate row indices, but rather a single offset index. Therefore, scatter operations are not required after a compute operation. Instead, a system may execute a single 64-byte or 128-byte read/modify/write for each packet to update an output vector.

Similarly, values fields 530 include a predefined field for each row within the slice. Using the example above, if the value of the non-zero element in the second row is 4, the FMDS generator stores a "4" in the index field that is predefined to row 2 (see FIGS. 8-9C and corresponding text for further details). The embodiment in FIG. 5 shows that single precision packet 500 includes 16 values fields, one for each row included in one slice, which corresponds to the number of work units assigned to a work unit cluster for half-warp computer architectures. In this embodiment, the first element of each packet is associated with an element of an output array whose index is a multiple of 16, and each subsequent element in the packet updates the corresponding subsequent element of the output array. Thus, only one index for the offset into the output array is stored, which corresponds to the first element of the packet.

Header 510 includes four fields, which are tile offset field 540, next tile offset field 550, remaining packets number for current slab field 560, and slice offset field 570. The FMDS generator stores a tile offset in tile offset field 540 that corresponds to the particular tile that includes the element information in indices fields 530 and values fields 530. For example, referring to FIG. 4A, the FMDS generator includes tile offset 250 in tile offset field 540. As discussed in FIG. 4A, the tile offset correlates with the input vector offset that includes data to be multiplied by the data included in tile 240.

In order to facilitate "read ahead" on blocks of the input vector, the FMDS generator stores an offset corresponding to the next tile that includes non-zero elements (relative to the current tile). Referring back to FIG. 4A and assuming the tile to the right of tile 240 includes a non-zero element, the FMDS generator includes next tile offset 410 in next tile offset field 550. As discussed in FIG. 4A, the next tile offset correlates with the next input vector offset that includes data to be multiplied by the data included in the next tile.

In one embodiment, the FMDS generator creates packets for non-zero elements on a slab-by-slab basis. In this embodiment, once the packets are created for a selected slab, the FMDS generator starts from the last packet created (corresponds to last tile, last slice, etc.) and stores an incremental "remaining packets" number in field 560 for each packet, which allows kernels to control their loop structures while processing packets. For example, the last packet has "0" stored in field 560, the next to last packet has "1" stored in field 560, and etcetera.

Header 510 also includes slice offset field 570, which corresponds to the slice offset including the element information stored in the packet. Referring back to FIG. 4A and assuming the packet includes element information for the last slice in tile 240, the FMDS generator includes slice offset 320 in slice offset field 570. As discussed in FIG. 4A, the slice offset correlates with the output vector secondary offset of output vector 420 for which to store output data. As a result, output indices are not individually stored in a packet, but rather a single offset (slice offset field 570) is loaded into each packet, and all output data is implicitly keyed off that offset when writing to an output vector. Furthermore, every read-modify-write operation to the local output buffer is fully coalesced across 16 compute units (see FIGS. 15-17 and corresponding text for further details).

Figure 6:
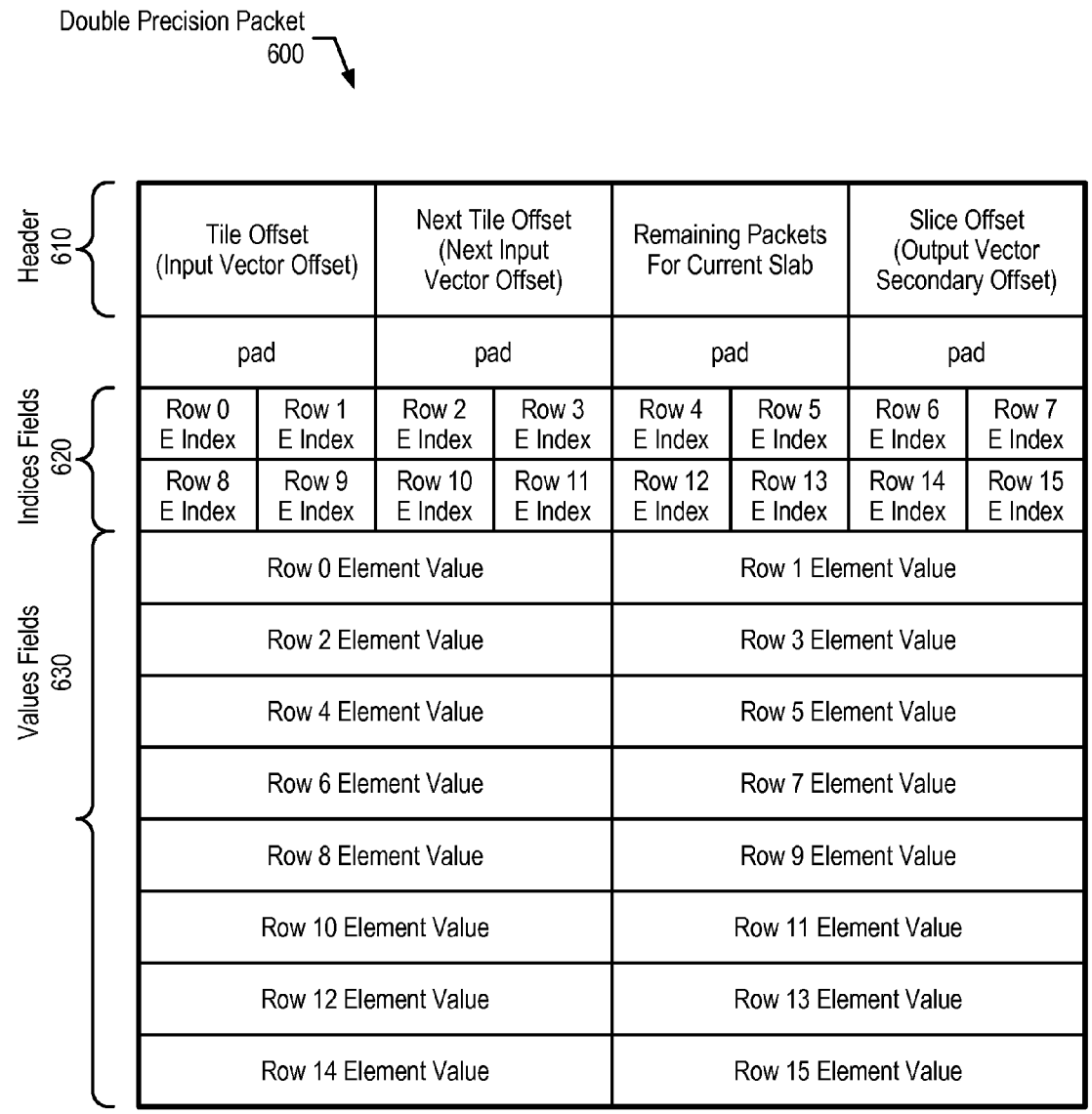
FIG. 6 is a diagram showing a packet generated by a FMDS generator for double precision operations.

FIG. 6 is a diagram showing a packet generated by a FMDS generator for double precision operations. Double precision packet 600 is similar to single precision packet 500 shown in FIG. 5, with the exception that double precision packet 600 is 192 bytes long instead of 128 bytes long. Header 610 and indices fields 620 are similar to header 510 and indices fields 520, but values fields 630 are larger than values fields 520 in order to support double precision element values.

Figure 7:
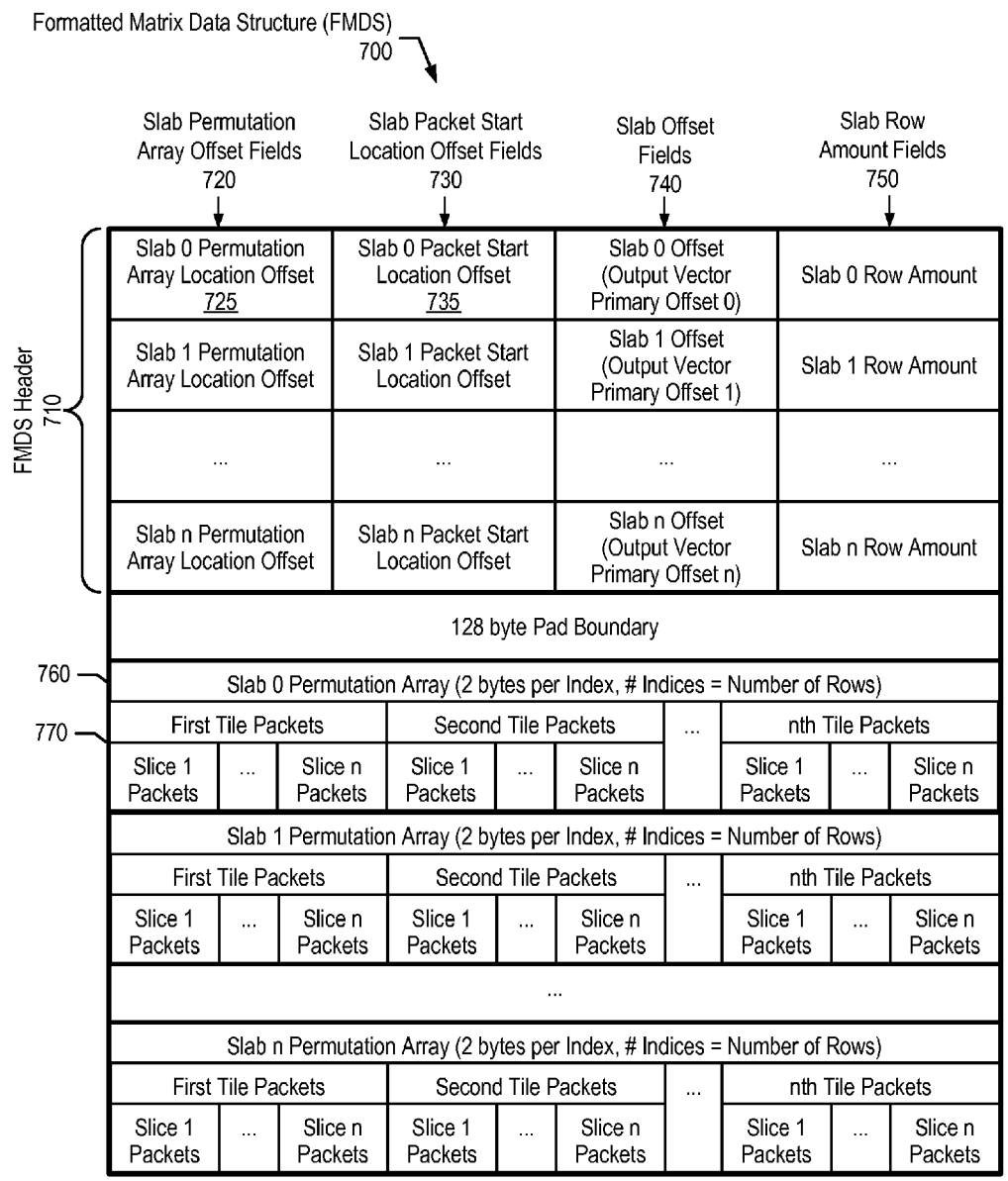
FIG. 7 is a diagram showing a formatted matrix data structure (FMDS)

FIG. 7 is a diagram showing a formatted matrix data structure (FMDS). FMDS 700 includes FMDS data structure header 710 that, in one embodiment, includes four predefined fields for each slab (fields 720-750). Slab permutation array location offset fields 720 includes an offset location of a slab's permutation array that includes row sorting information within the particular slab (see FIGS. 11, 14, and corresponding text for further details). For example, slab 0 permutation array location offset 725 identifies offset 760, which is the location of slab 0's permutation array. Each of slab packet start location offset fields 730 includes a starting location where a particular slab's packets are stored within FMDS 700. For example, slab 0 packet start location offset 735 identifies offset 770, which is the starting location of packets for slab 0.

FMDS header 710 also includes one of slab offset fields 740 for each slab. This value corresponds to the slab offset location relative to the sparse matrix, such as slab offset 230 shown in FIG. 2. FMDS header 710 includes one of slab row amount fields 750 for each slab as well. The FMDS generator identifies the number of rows in each slab, and enters an appropriate number in each slab's corresponding slab rout amount field 750.

FMDS packets 720 show how the FMDS generator organizes packets within FMDS 700. As can be seen, the packets are first organized by slab number (starting with 0). The packets for a particular slab are organized by tile number, and by slice number within each tile. In one embodiment, when a particular slice generates multiple packets (from multiple non-zero elements included in one particular row), these packets are organized according to the order in which they are generated. Meaning, the first non-zero element for each row is included in the first packet, the second non-zero elements for each row is included in the second packet, etc. (see FIGS. 9A-C and corresponding text for further details).

Figure 8:
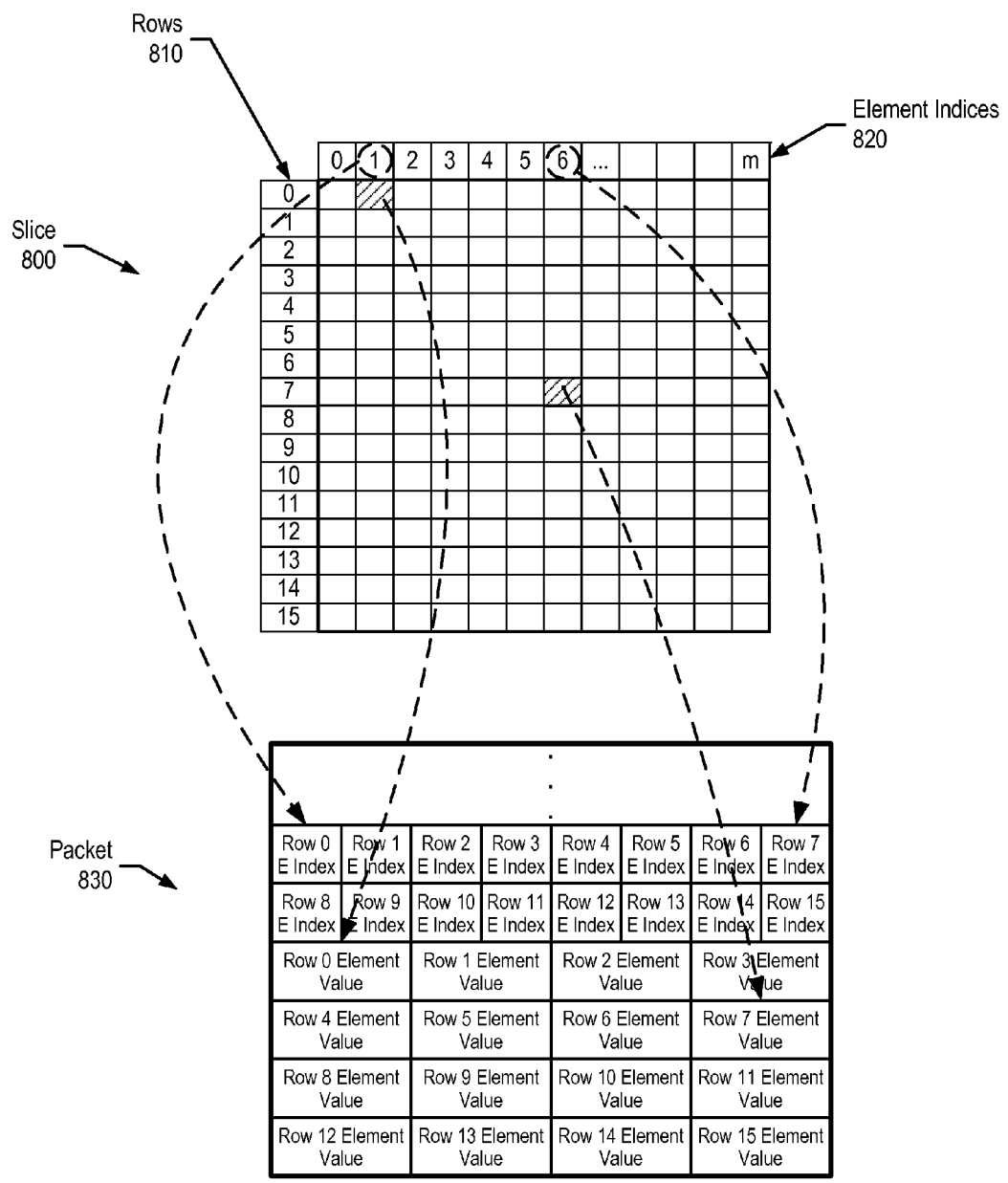
FIG. 8 is a diagram showing how a FMDS generator maps non-zero element information from a sparse matrix tile slice into predefined fields included a packet.

FIG. 8 is a diagram showing how a FMDS generator maps non-zero element information from a sparse matrix tile slice to a packet. Slice 800 is part of a tile within a slab, within a sparse matrix. Slice 800 includes 16 rows (rows 810) and M element indices 820. In one embodiment, slice 800 may have thousands of elements per row.

Slice 800 includes two non-zero elements. One non-zero element is in row 0, element index 1, and the other non-zero element is in row 7, element index 6. As such, for row 0, the FMDS generator stores a "1" in the element index field assigned to row 0, and stores the value of the element in the value field assigned to row 0. Likewise, for row 7, the FMDS generator stores a "6" in the element index field assigned to row 7, and stores the value of the element in the value field assigned to row 7. If slice 800 included any rows that included more than one non-zero element, the FMDS generator creates another packet to handle the subsequent non-zero elements (see FIGS. 9A-9C and corresponding text for further details).

Figures 9A, 9B, 9C:
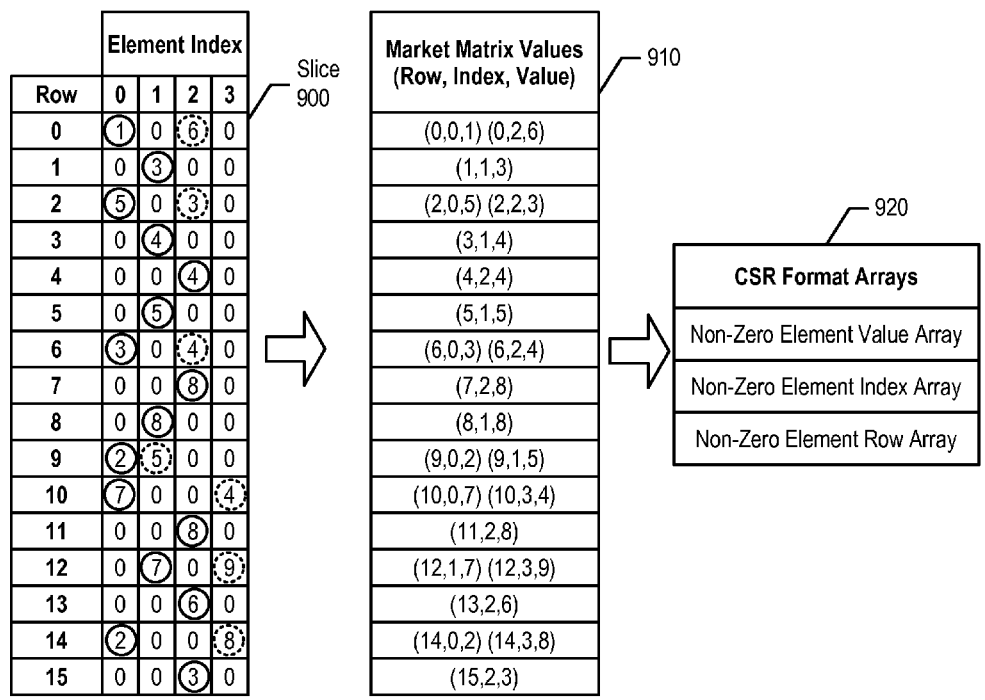
FIG. 9A is a diagram showing sparse matrix tile slice information converted to compressed sparse row (CSR) arrays.
FIGS. 9B and 9C are diagrams of packets that are generated from non-zero elements included in slice 900 shown in FIG. 9A.

FIG. 9A is a diagram showing sparse matrix tile slice information converted to compressed sparse row (CSR) arrays. Slice 900 includes 16 rows and four element indices, which is a simplified example. In one embodiment, slice 800 may have thousands of element indices. Each of slice 900's rows include a non-zero element, and some of the rows include two non-zero elements. These non-zero elements are represented as market matrix values 910, which each include a row value, an element index value, and an element value. In one embodiment, the FMDS generator retrieves market matrix values 910 and converts them to CSR format arrays 920 for ease of processing. CSR format arrays 920 include separate arrays for the row values, the element index values, and the element values. In turn, the FMDS generator uses CSR format arrays 920 to create a formatted matrix data structure (see FIGS. 9-14 and corresponding text for further details).

FIGS. 9B and 9C are diagrams of packets that are generated from non-zero elements included in slice 900 shown in FIG. 9A. The FMDS generator identifies the first non-zero element in each row, which are the elements with a solid line circle. The FMDS generator includes their element index and element value in predefined index fields and value fields corresponding to each row. As can be seen, since row 0 includes a "1" in element index 0, first packet 903 includes a "1" in the value field assigned to row 0 (field 932), and includes a 0 in the index field assigned to row 0 (field 938). In addition, since each row in slice 900 includes at least one non-zero element, all of first packet 930's element index fields and element value fields are filled.

FIG. 9B is a diagram of a second packet that the FMDS generator creates to handle rows that include a second non-zero element, which are the elements with a dashed line circle. Since relatively half of the rows include a second non-zero element, relatively half of the fields are filled in second packet 940. For example, since row 3 includes only one non-zero element, which was taken care of with first packet 930, the element index field and element value field assigned to row 3 are empty in second packet 940. As one skilled in the art can appreciate, the FMDS generator may include a "0" or null value in fields whose corresponding rows do not include non-zero values.

Figure 10:
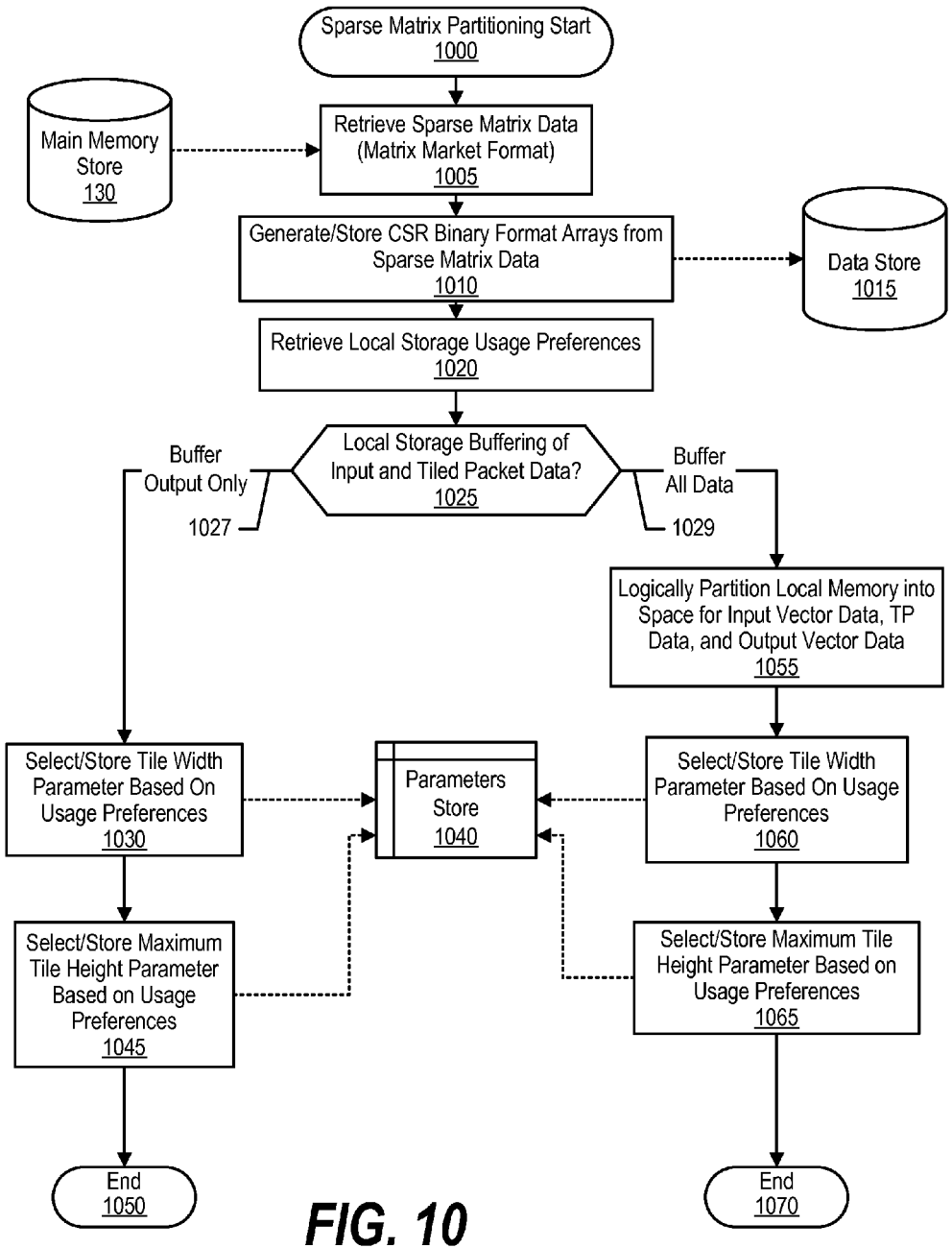
FIG. 10 is a flowchart showing steps taken in selecting tile dimension parameters based upon local storage usage preferences.

FIG. 10 is a flowchart showing steps taken in selecting tile dimension parameters based upon local storage usage preferences. Processing commences at 1000, whereupon processing retrieves sparse matrix data from main memory store 130 (step 1005). In one embodiment, the sparse matrix data is in a market matrix (MM) format. At step 1010, in order to process the data on a vector basis, processing generates and stores the sparse matrix data into CSR (compressed sparse row) format arrays, and stores the arrays in data store 1015 (see FIG. 9A and corresponding text for further details).

Next, processing retrieves local storage preferences at step 1020. In one embodiment, a user specifies whether local storage is solely for output data buffering, or whether the local storage should be used to buffer all data (input vector data, matrix data, and output vector data). A determination is made as to whether to use the local storage solely for output buffering or to buffer all data (decision 1025). If local storage should be used for just output buffering, decision 1025 branches to "Buffer Output Only" branch 1027, whereupon processing selects and stores a tile width parameter in preferences store 1040 at step 1030. In one embodiment, processing may select the largest number possible as a tile width as long as it is not larger than the size of the full matrix and no larger than 65,536.

At step 1045, processing selects and stores a maximum tile height parameter in preferences store 1040. In one embodiment, processing selects a maximum tile height to be a number that allows all available work group clusters to have at least one slab to process, and also allow output buffer data (based on tile height) to fit into local memory. Processing uses these preferences later when identifying slab breakpoints (see FIG. 11 and corresponding text for further details). Processing ends at 1050.

On the other hand, if local storage should be used to buffer all data, decision 1025 branches to "Buffer All Data" branch 1029, whereupon processing logically partitions the local memory into an input data buffer area, a matrix data buffer area, and an output data buffer area (step 1055). Next, processing selects and stores a tile width parameter in preferences store 1040 (step 1060). In one embodiment, the tile width may be a largest number with restrictions that the width is smaller than the size of the full matrix; the width is no larger than 65,536; and the input buffers (based on tile width) fit into the input data buffer area.

At step 1065, processing selects and stores a maximum tile height parameter in preferences store 1040. In one embodiment, processing selects a maximum tile height to be a number that allows all available work group clusters to have at least one slab to process, and also allow output buffer data (based on tile height) to fit into local memory. Processing ends at 1070.

Figure 11:
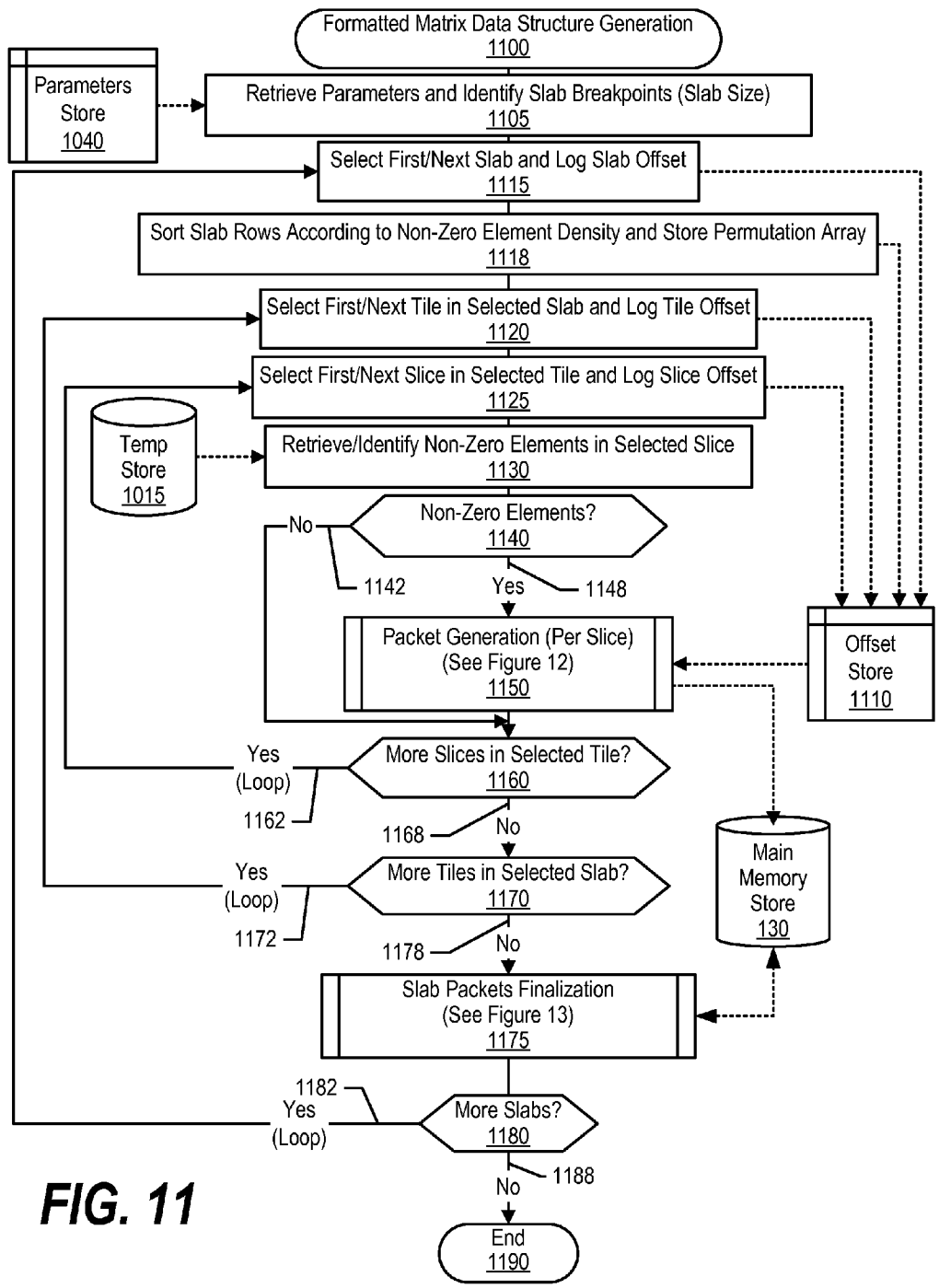
FIG. 11 is a flowchart showing steps taken in generating a formatted matrix data structure from sparse matrix data.

FIG. 11 is a flowchart showing steps taken in generating a formatted matrix data structure from sparse matrix data. Processing commences at step 1100, whereupon processing retrieves parameters from parameters store 1040 (step 1105) that processing uses for identifying slab breakpoints. The parameters, which were created in FIG. 10, indicate a maximum tile width and tile size. In one embodiment, processing identifies the total number of non-zero elements in a sparse matrix (e.g., the number of elements in the CSR large arrays), and divides the total number of non-zero elements by the number of work unit clusters, which results in "target number of elements in each slab" (e.g., guarantees that each work cluster has work to perform). In this embodiment, processing analyzes the CSR arrays and identifies row boundaries that would most closely result in the target number for each slab. In turn, these row boundaries become the slab boundaries. In this embodiment, a slab boundary that exceeds the "maximum tile height" parameter (from step 1105) may be clipped to the maximum tile height, resulting in a slab with fewer non-zero elements than the target number of elements (see FIG. 10 and corresponding text for further details).

At step 1115, processing selects the first slab and logs a slab offset in offset store 1110. The slab offset corresponds to the location of the first row in the selected slab within the sparse matrix (slab offset 310 shown in FIGS. 3 and 4A). For example, the first (top) slab offset may be "0." At step 1118, in an effort to reduce the number of "unbalanced slices" within a slab (slices where the data is not spread evenly over the rows of the slice, resulting in too many zeros showing up in the packets), processing sorts the slab rows (rows in the slab) according to their corresponding non-zero element densities (how may non-zero elements are in the row). Processing also stores indices in a permutation array that identifies the slab row sort order, and stores the permutation array in offset store 1110. In turn, future output data generation processing may read the permutation array to determine how to write the output data back to main memory in order to store the data in the proper arrangement (see FIG. 17 and corresponding text for further details).

Next, at step 1120, processing selects the first tile in the selected slab and logs a tile offset in offset store 1110. The tile offset corresponds to the location of the first element included in the selected tile. For example, the first (left most) tile offset may be "0" (FIG. 4A shows that the second tile in the second slab is currently selected). Both the slab offset and tile offset are subsequently stored in each packet corresponding to the selected tile (discussed below).

At step 1125, processing selects the first slice in the selected tile and logs a slice offset in offset store 1110. Again, for the first (top) slice within the first tile, the slice offset may be "0." The slab offset, tile offset, and slice offset are each stored in each packet that is generated for non-zero values included in the selected slice (see FIG. 12 and corresponding text for further details).

Processing retrieves and identifies non-zero elements from temporary store 1015 corresponding to the selected slice (step 1130). In one embodiment, these elements reside in a CSR array format, such as that generated in FIG. 10. A determination is made as to whether there are any non-zero elements in the selected slice (decision 1140). For example, since the sparse matrix is sparsely populated with non-zero elements, there may be many slices, or even tiles, that fail to include non-zero elements.

If the selected slice does not include any non-zero elements, decision 1140 branches to "No" branch 1142 bypassing packet generation steps for the selected slice. On the other hand, if there are any non-zero elements included in the selected slice, decision 1140 branches to "Yes" branch 1148, whereupon processing generates packets for the selected slice (includes offset information in offset store 1110), and stores the packets in memory store 130 (pre-defined process block 1150, see FIG. 12 and corresponding text for further details).

A determination is made as to whether there are more slices in the selected tile for which to process (decision 1160). If there are more slices to process, decision 1160 branches to "Yes" branch 1162, which loops back to select the next slice. This looping continues until there are no more slices to process in the selected tile, at which point decision 1160 branches to "No" branch 1168.

A determination is made as to whether there are more tiles in the selected slab for which to process (decision 1170). If there are more tiles to process, decision 1170 branches to "Yes" branch 1172, which loops back to select the next tile. This looping continues until there are no more tiles to process in the selected slab, at which point decision 1170 branches to "No" branch 1178.

Figure 13:
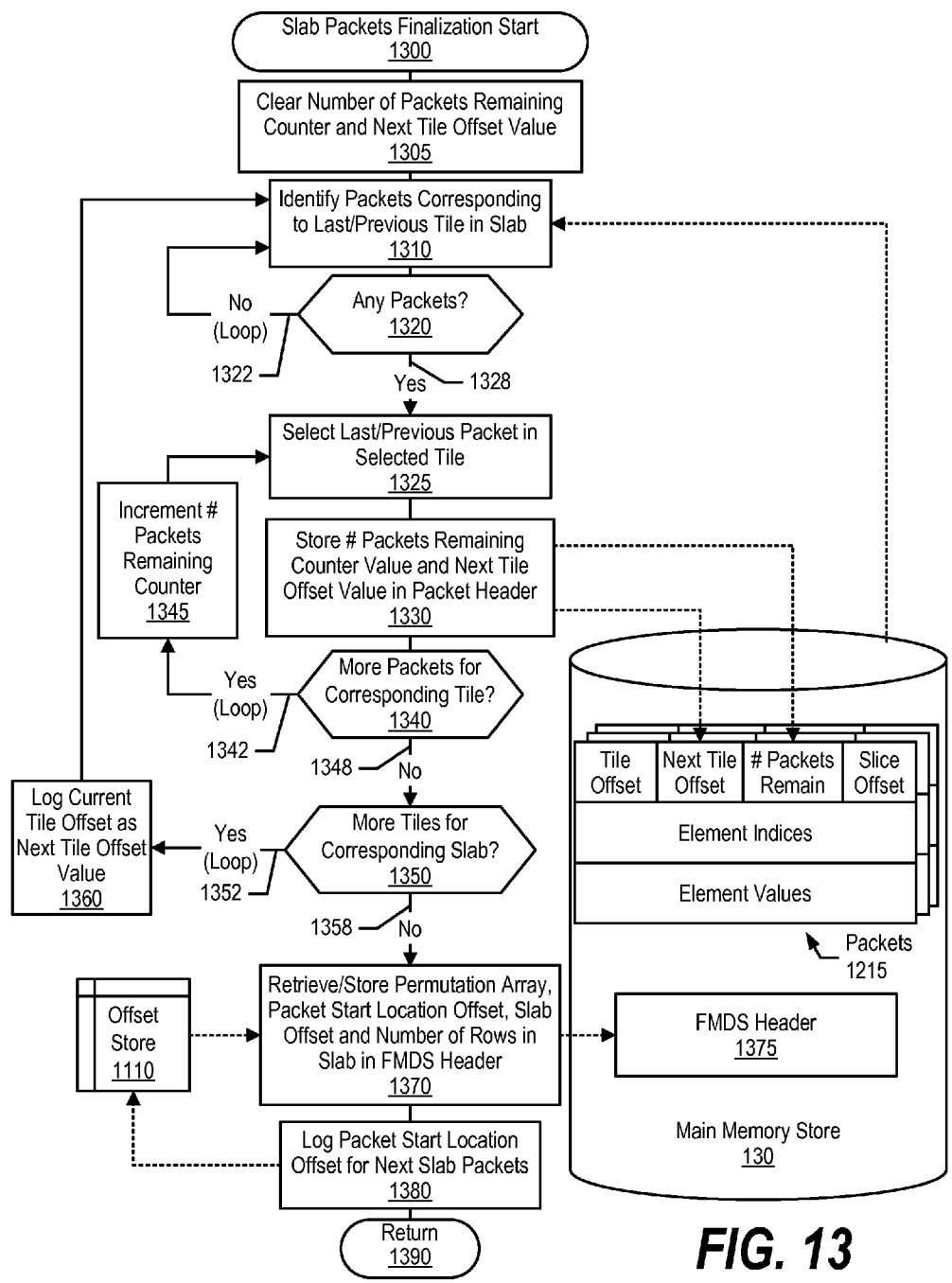
FIG. 13 is a flowchart showing steps taken in finalizing header information for packets that correspond to a particular slab.

Once packets are generated for the selected slab, processing finalizes header information in each packet for the selected slab along with including slab information in the FMDS header (pre-defined process block 1175, see FIG. 13 and corresponding text for further details).

A determination is made as to whether there are more slabs in the sparse matrix for which to process (decision 1180). If there are more slabs to process, decision 1180 branches to "Yes" branch 1182, which loops back to select the next slab. This looping continues until there are no more slabs to process in the sparse matrix, at which point decision 1180 branches to "No" branch 1188 whereupon processing ends at 1190.

Figure 12:
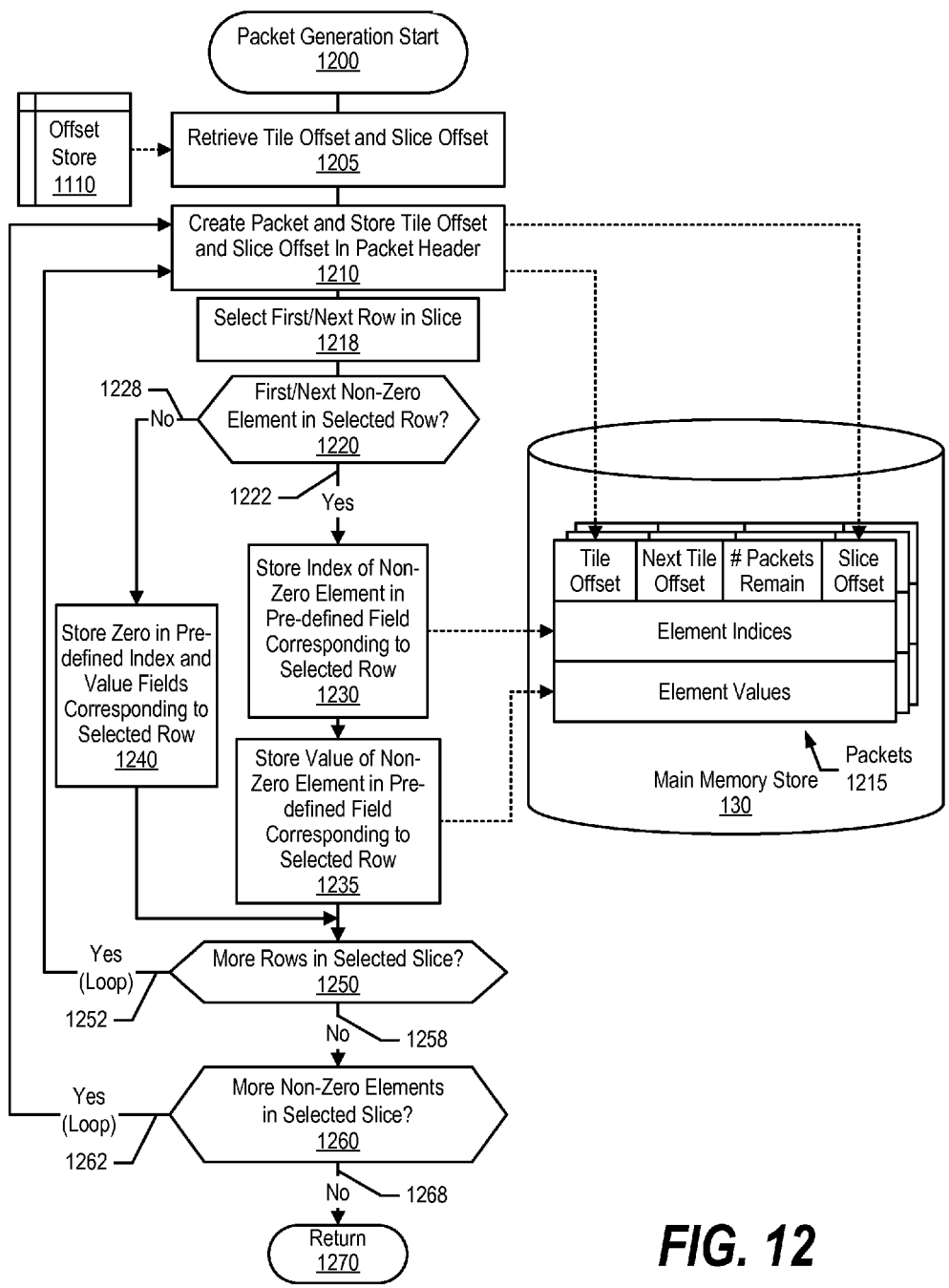
FIG. 12 is a flowchart showing steps taken in generating packets for a selected slice of sparse matrix data.

FIG. 12 is a flowchart showing steps taken in generating packets for a selected slice of sparse matrix data (selected in FIG. 11). Processing commences at 1200, whereupon processing retrieves stored tile offset and slice offset information from offset store 1110 that corresponds to the selected slice and tile. At step 1210, processing creates one of packets 1215 and stores the tile offset and slice offset in corresponding packet header fields (see FIGS. 5-6 and corresponding text for further details). Two other packet fields, which are a next tile offset field and a number of packets remaining field, are dependent upon other packets not yet generated for the particular slice (e.g., packets for other tiles). As such, in one embodiment, these fields are not filled in until each packet for a selected slab is generated (see FIG. 13 and corresponding text for further details).

Processing selects the first row in the selected slice, and a determination is made as to whether the first row includes a non-zero element (decision 1220). If the first row includes a non-zero element, decision 1220 branches to "Yes" branch 1222, whereupon processing stores the non-zero element's element index in an element index field included in packet 1215 that is predefined to the first row. Processing then stores the non-zero element's element value in an element value field included in packet 1215 that is predefined to the first row (see FIGS. 5-6 and corresponding text for further details).

On the other hand, if the first row does not include a non-zero element, decision 1220 branches to "No" branch 1228, whereupon processing stores, in one embodiment, a zero in the particular element index field and element value field designated for the first row. As those skilled in the art can appreciate, other embodiments are possible to identify the lack of non-zero elements in a particular row, such as storing a null value in the element index field.

A determination is made as to whether there are more rows in the selected slice (decision 1250). In one embodiment, each slice includes sixteen rows (see FIG. 3 and corresponding text for further details). If there are more rows to process, decision 1250 branches to "Yes" branch 1252, which loops back to select the next (e.g., second) row and process non-zero elements with that row. This looping continues until each row within the slice is processed (e.g., sixteen rows), at which point decision 1250 branches to "No" branch 1258. At this point, each first non-zero element within each row has been processed and represented in the first packet 1215. Referring to FIG. 9A, each of the non-zero elements with a solid line circle is represented in the first packet.

A determination is made as to whether there are more non-zero elements (in any row) in the selected slice that have not yet been processed (decision 1260). Referring to FIG. 9A, each of the non-zero elements with a dashed line still need to have information stored in a packet, such as that shown in FIG. 9C. If there are more non-zero elements for which to process in the slice, decision 1260 ranches to "Yes" branch 1262, which loops back to process the second non-zero elements in each row. In one embodiment, many rows may not include a second non-zero element, at which case a zero (or null) value is stored in their respective element index field and/or element value field (step 1240).

This looping continues until each non-zero element is represented in one of packets 1215, at which point decision 1260 branches to "No" branch 1268, whereupon processing ends at 1270.

FIG. 13 is a flowchart showing steps taken in finalizing packet header information for packets that correspond to a particular slab. Once processing generates packets for an entire slab (see FIG. 11 and corresponding text for further details), processing proceeds to fill in two remaining header fields for each packet corresponding to the slab (Next Tile Offset field and Number of Packets Remaining field).

Processing commences at 1300, whereupon processing clears a "number of packets remaining" counter value and a "next tile offset" value. In one embodiment, processing begins filling in header fields at the "last packet" of the slab, which corresponds to the last slice included in the last tile. In this embodiment, processing works backwards to count the number of packets that remain for a given slab relative to each packet.

At step 1310, processing identifies packets in main memory store 130 that correspond to the last tile in the selected slab. A determination is made as to whether any packets correspond to the last tile (decision 1320). For example, the last tile in a slab may not include any non-zero elements and, in this example, processing would not have generated any packets for the last tile. If no packets exist that correspond to the last tile, decision 1320 branches to "No" branch 1322, which loops back to select the previous tile (e.g., second from the last tile) and determines whether any packets correspond to the selected previous tile. This looping continues until processing identifies a tile that has corresponding packets, at which point decision 1320 branches to "Yes" branch 1328.

Processing selects the last packet that corresponds to the selected tile at step 1325. Next, processing stores a number of packets remaining value and a next tile offset value in the selected packet (step 1330). For example, if the selected packet corresponds to the last tile in a slab, processing may include a "0" or a null value in the next tile offset (since the packet corresponds to the last tile), and include a "0" or null in the number of packets remain (since the packet is the last packet of the slab). In another example, if the selected packet is the $10^{th}$ to last packet for the last slab, processing may enter a "9" in the number of packets remaining. In yet another example, assuming 100 packets correspond to the last tile, and the $5^{th}$ to last packet corresponding to the second to last tile is being processed, processing would enter a next tile offset corresponding to the last tile in the next tile offset field, and enter "104" in the number of packets remaining field (100+4) (see FIG. 4A and corresponding text for further details).

A determination is made as to whether there are more packets corresponding to the selected tile for which to finalize header information (decision 1340). If there are more packets to process, decision 1340 branches to "Yes" branch 1342, whereupon processing loops back to increment the number of packets remaining counter (step 1345), and store next tile offset values and number of packets remaining values in the next packet. This looping continues until there are no more packets to process that correspond to the selected tile.

A determination is made as to whether there are more tiles included in the slab for which to process corresponding packets (decision 1350). If there are more tiles included in the selected slab, decision 1350 branches to "Yes" branch 1352, which loops back to log the currently selected tile offset as a "next tile offset" value (step 1360) and process the previous tile's packets accordingly. For example, if processing just finished processing packets for "tile 9," then processing log's tile 9's offset location as the next tile offset value that will be included in packets that correspond to "tile 8."

This looping continues until processing processes each packet for the slab, at which point decision 1350 branches to "No" branch 1358. At step 1370, processing retrieves a slab permutation array, a packet start location offset, a slab offset, and a number of rows value from offset store 1110, and stores the retrieved information in predefined fields for the selected slab in FMDS header 1375 (see FIGS. 7, 11, and corresponding text for further details).

At step 1380, processing logs a packet start location offset for the next slab, which is based upon the ending address of the last packet of the previous slab. Processing returns at 1390.

Figure 14:
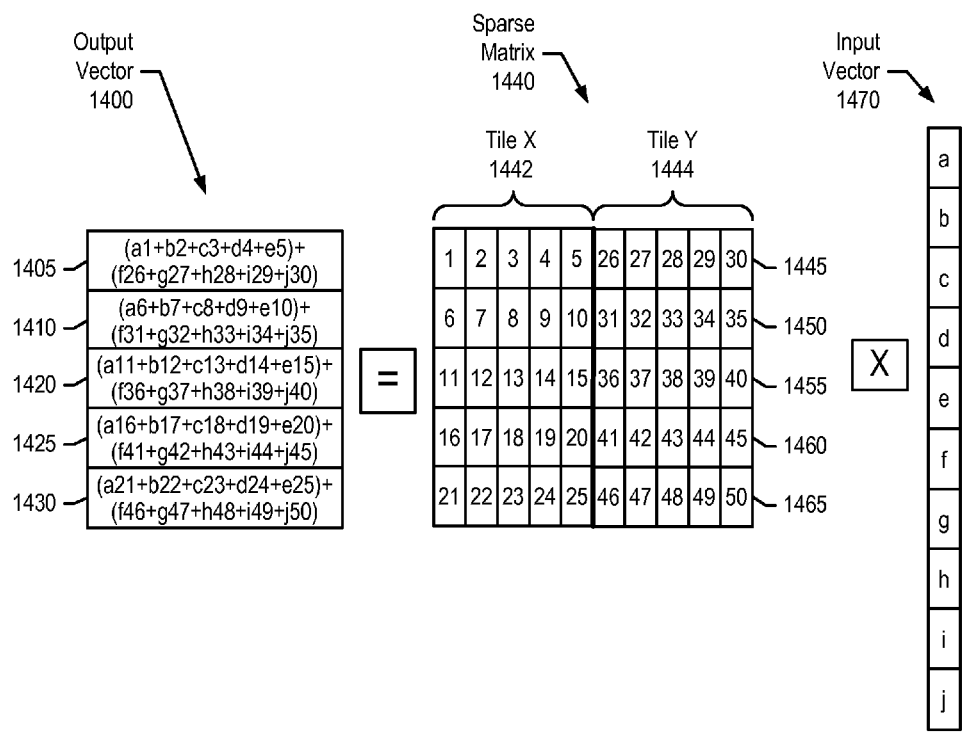
FIG. 14 is a diagram showing a sparse matrix multiplied by an input vector to produce an output vector.

FIG. 14 is a diagram showing a sparse matrix multiplied by an input vector to produce an output vector. A sparse matrix-vector multiplication (SpMV) algorithm computes an equation of the form y=A*x, where y is an output vector, x is an input vector, and A is a matrix (sparse matrix). Sparse matrix 1440 includes rows 1445 through 1465. Each work unit within a work cluster is responsible for computations for a particular row. When sparse matrix 1440 multiplies with input vector 1470, each of sparse matrix rows 1445-1465 correspond to each of output vector 1400's rows 1405-1430, respectively. When a work unit multiplies tile X 1442's row 1445 with input vector 1470, the work unit stores the value of the computation a*1+b*2+c*3+d*4+e*5 in output vector location 1405. Likewise, when the work unit multiplies tile Y 1444's row 1445 with input vector 1470, the work unit adds the value of the computation f*26+g*27+h*28+i*29+j*30 to the existing computation above using an unimproved algorithm which explicitly operates on the vast majority of zeros in the sparse matrix.

Therefore, each work unit within a work unit cluster computes output values for a particular output vector location by focusing on a single row within sparse matrix 1440. This disclosure describes an improvement upon this basic idea, wherein the data within the matrix is organized into packets, which still allow each work unit to focus on a single row, but removes a majority of the extraneous "multiply by zero" operations. The packets may still contain some zero elements, but their frequency is greatly reduced (see FIGS. 15-17 and corresponding text for further details).

Figure 15:
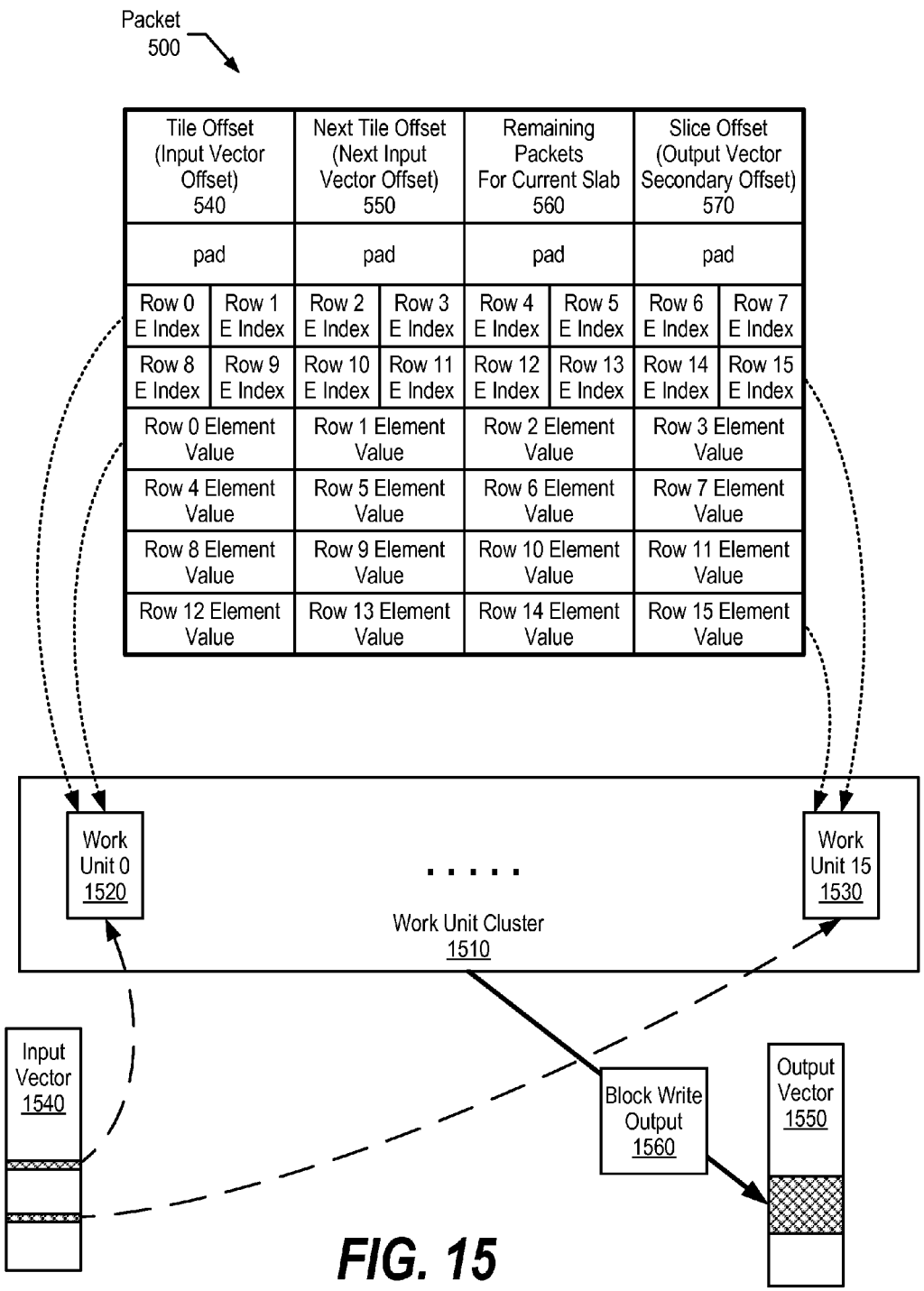
FIG. 15 is a diagram showing work units processing data from predefined packet field locations.

FIG. 15 is a diagram showing work units processing data from predefined packet field locations. As discussed herein, packet 500 includes predefined fields that correspond to consecutive rows of a sparse matrix, and work unit cluster 1510 includes a work unit for each of the consecutive rows. FIG. 15 shows that work unit 0 1520 retrieves information from packet 500 pertaining to "row 0" and work unit 15 1530 retrieves information from packet 500 pertaining to "row 15."

In one embodiment, when a work unit retrieves an element value from packet 1500, the work unit retrieves a corresponding input value from input vector 1540 using input vector offset 540 as a basis for the retrieval location. Once each of the work units within work unit cluster 1510 performs a multiplication operation, work unit cluster 1510 performs a block write and stores block write output 1560 (16 output values) in output vector 1550 using output vector secondary offset 570 as a basis for the storage location.

Figure 16:
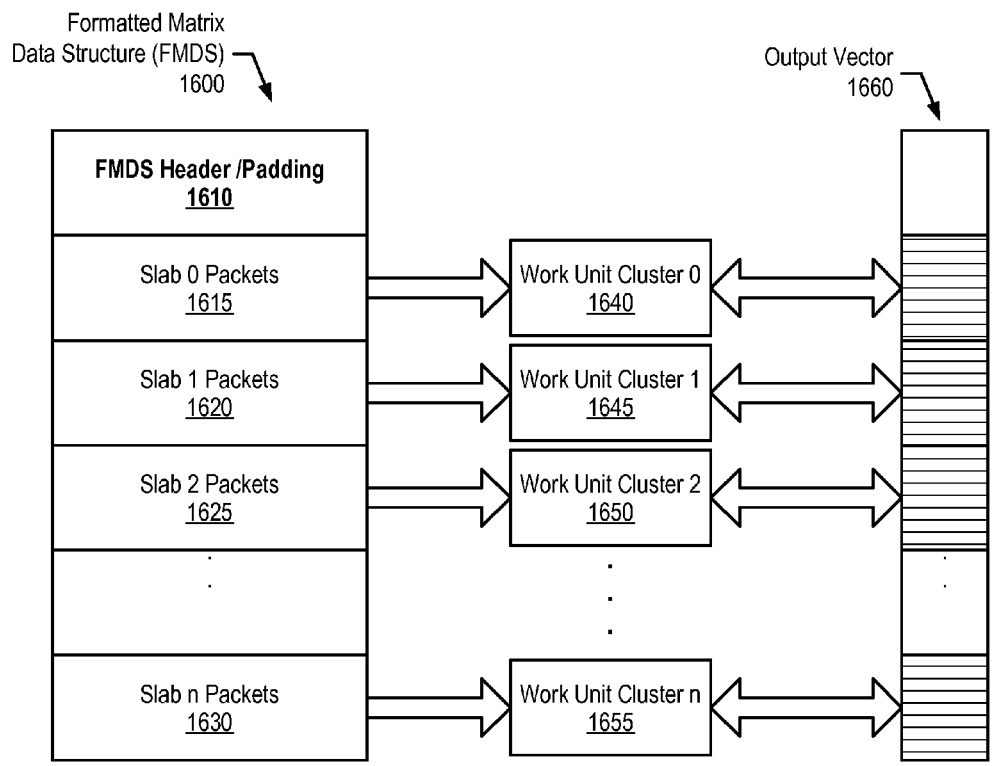
FIG. 16 is a diagram showing work unit clusters processing packets for assigned slabs and block writing output values to an output vector.

FIG. 16 is a diagram showing work unit clusters processing packets for assigned slabs and block writing output values to an output vector. FMDS 1600 includes packets corresponding to a number of slabs. Each of work unit clusters 1640-1655 is assigned to process a group of "slab packets" to generate output data that each of work unit clusters 1640-1655 block writes to output vector 1660, which may be located in a local output buffer. Each of work unit clusters 1640-1655 computes a "partial output value for a packet and adds the partial output value to a cumulative current output value for a group of consecutive rows within output vector 1660. As each work unit cluster finishes processing its packets, the section of output vector 1660 assigned to that cluster is stored back in main memory. In one embodiment, processing uses a permutation array to re-arrange rows within output vector 1660 before they are stored in the main memory (see FIG. 17 and corresponding text for further details).

Figure 17:
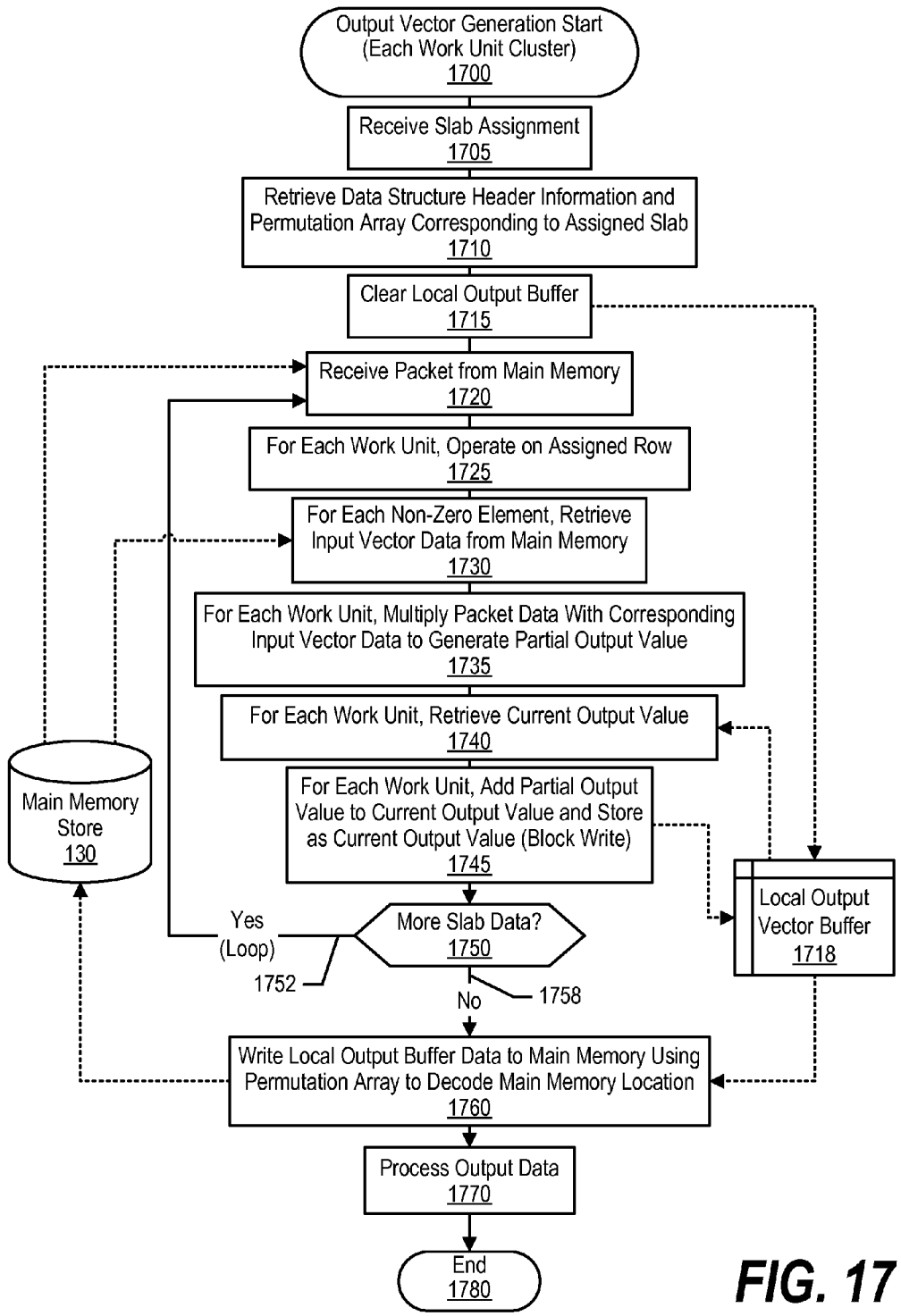
FIG. 17 is a flowchart showing steps taken multiplying sparse matrix data with input vector data and block writing the result to an output vector.

FIG. 17 is a flowchart showing steps taken multiplying sparse matrix data with input vector data and block writing the result to an output vector. Processing commences at 1700, wherein each work unit cluster receives a slab assignment, such as slab 2 (step 1705). At step 1710, each work unit cluster retrieves data structure header information, such as the packet start location offset, slab offset, and slab row amount, along with a permutation array corresponding to the assigned slab (see FIG. 7 and corresponding text for further details).

Next, at step 1715, the work unit cluster clears its local output vector buffer 1718. The work unit cluster then retrieves a packet from main memory store 130 at a location based upon the packet start location offset (retrieved above). At step 1725, each work unit within the cluster proceeds to operate on its assigned row (with corresponding element value and input offset).

At step 1730, for each element, the work unit cluster (or individual work units) retrieves an input vector data value from main memory store 130 (see FIG. 15 and corresponding text for further details). Each work unit then multiplies the retrieved input value with their corresponding value to generate a "partial output value" at step 1735. Next, at step 1740, each work unit retrieves a current output value corresponding to their assigned output location; adds the partial output value to the current output value, and stores the result back in the assigned output location within local output vector buffer 1718 (step 1745, see FIG. 15 and corresponding text for further details).

In one embodiment, a system includes a memory controller that retrieves future input data (e.g., packets for a next tile) while a work unit performs operations (e.g., multiplications) on current input data (e.g., packets for a current tile). In this embodiment, the memory controller retrieves an offset from a packet's "Tile Offset field" (e.g., "current tile offset") and reads input data located at the retrieved offset. When the memory controller identifies a packet whose tile offset is different from the current tile offset, the memory controller begins reading input data located at the packet's "next tile offset" field. This embodiment allows the input data to be readily available to the work units for multiplication operations. Furthermore, in this embodiment, the memory controller retrieves future matrix packets from global memory into a local memory buffer while the work cluster is operating on the current set of packets in another local memory buffer. This embodiment allows the matrix data to be readily available to the work units for multiplication operations.

A determination is made as to whether there are any more packets that correspond to the assigned slab (decision 1750). If there are more packets, decision 1750 branches to "Yes" branch 1752, whereupon the work unit cluster loops back to process another packet. This looping continues until there are no more packets to process for a slab, at which point decision 1750 branches to "No" branch 1758. At step 1760, each work unit cluster uses the permutation array retrieved in 1710 above to determine the correct location in main memory to store each output value in its local output array, and stores all of the values in its local array to their correct destinations in main memory store 130. In one embodiment, at this point, the work unit cluster may be assigned to a different slab and process packets that correspond to the different slab.

At step 1770, processing processes the output vector values stored in main memory store. For example, a user may conduct an experiment using a square metal plate that has three of its four edges "held" at three different temperatures, by external heat sources, while the fourth edge (and the interior) are free to find their own "steady state" temperature. The user may create a grid of points on the plate that, in turn, is represented as a one dimensional array of temperature values (e.g., a 100 by 100 grid would result in a one-dimensional vector of size 10,000).

Continuing with this example, a sparse-matrix (sized 10,000 by 10,000) may include information that corresponds to influences each point has on itself and its eight neighbors, as the experiment proceeds through time steps. The sparse-matrix comprises weighting factors, such that the output for one element is the weighted sum of the temperature values of each of its eight neighboring elements plus itself. In this example, input vector value estimates are entered for the temperature of each point, and then multiplied by the sparse-matrix information to evaluate the output vector values. The input vector values are then adjusted based upon the output vector values and re-multiplied by the sparse-matrix data. In this example, the new input vector is simply the most recently produced output vector, but other examples could make use of more non-trivial processing. After several iterations, a steady state is achieved where the output vector values corresponds to the input vector values within a defined tolerance and, therefore, can be taken to represent the steady-state temperature at each of the 10,000 points on the plate.

As those skilled in the art can appreciate, other post processing implementations may be employed for disciplines such as structural engineering, computational fluid dynamics, model reduction, electromagnetics, semiconductor devices, thermodynamics, materials, acoustics, computer graphics/vision, robotics/kinematics, and etcetera. Processing ends at 1780.

Figure 18:
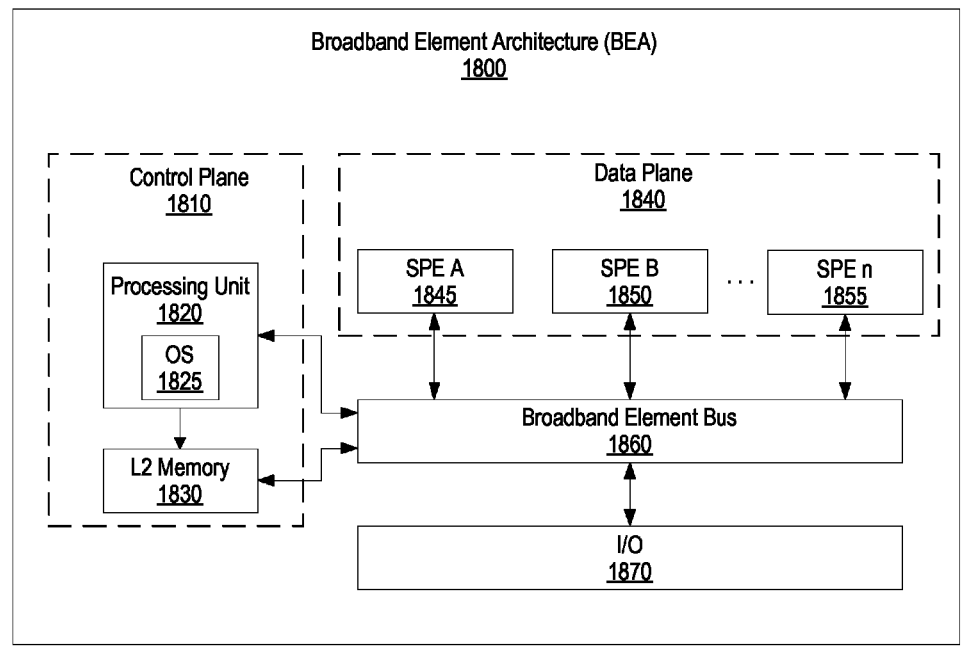
FIG. 18 is a diagram showing a broadband element architecture which includes a plurality of heterogeneous processors capable of performing the computing operations described herein.

FIG. 18 is a diagram showing a broadband element architecture which includes a plurality of heterogeneous processors capable of performing the computing operations described herein. The heterogeneous processors share a common memory and a common bus. Broadband element architecture (BEA) 1800 sends and receives information to/from external devices through input output 1870, and distributes the information to control plane 1810 and data plane 1840 using processor element bus 1860. Control plane 1810 manages BEA 1800 and distributes work to data plane 1840.

Control plane 1810 includes processing unit 1820 which runs operating system (OS) 1825. For example, processing unit 1820 may be a Power PC core that is embedded in BEA 1800 and OS 1825 may be a Linux operating system. Processing unit 1820 manages a common memory map table for BEA 1800. The memory map table corresponds to memory locations included in BEA 1800, such as L2 memory 1830 as well as non-private memory included in data plane 1840.

Data plane 1840 includes Synergistic processing element's (SPE) 1845, 1850, and 1855. Each SPE is used to process data information and each SPE may have different instruction sets. For example, BEA 1800 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 1845, 1850, and 1855 are connected to processor element bus 1860, which passes information between control plane 1810, data plane 1840, and input/output 1870. Bus 1860 is an on-chip coherent multi-processor bus that passes information between I/O 1870, control plane 1810, and data plane 1840. Input/output 1870 includes flexible input-output logic which dynamically assigns interface pins to input output controllers based upon peripheral devices that are connected to BEA 1800.

FIG. 19 illustrates information handling system 1900, which is another example of a computer system capable of performing the computing operations described herein. Information handling system 1900 includes one or more processors 1910 coupled to processor interface bus 1912. Processor interface bus 1912 connects processors 1910 to Northbridge 1915, which is also known as the Memory Controller Hub (MCH). Northbridge 1915 connects to system memory 1920 and provides a means for processor(s) 1910 to access the system memory. Graphics controller 1925 also connects to Northbridge 1915. In one embodiment, PCI Express bus 1918 connects Northbridge 1915 to graphics controller 1925. Graphics controller 1925 connects to display device 1930, such as a computer monitor.

Northbridge 1915 and Southbridge 1935 connect to each other using bus 1919. In one embodiment, the bus is a Direct Media Interface (DMI) bus that transfers data at high speeds in each direction between Northbridge 1915 and Southbridge 1935. In another embodiment, a Peripheral Component Interconnect (PCI) bus connects the Northbridge and the Southbridge. Southbridge 1935, also known as the I/O Controller Hub (ICH) is a chip that generally implements capabilities that operate at slower speeds than the capabilities provided by the Northbridge. Southbridge 1935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1996 and "legacy" I/O devices (using a "super I/O" chip). The "legacy" I/O devices (1998) can include, for example, serial and parallel ports, keyboard, mouse, and/or a floppy disk controller. The LPC bus also connects Southbridge 1935 to Trusted Platform Module (TPM) 1995. Other components often included in Southbridge 1935 include a Direct Memory Access (DMA) controller, a Programmable Interrupt Controller (PIC), and a storage device controller, which connects Southbridge 1935 to nonvolatile storage device 1985, such as a hard disk drive, using bus 1984.

ExpressCard 1955 is a slot that connects hot-pluggable devices to the information handling system. ExpressCard 1955 supports both PCI Express and USB connectivity as it connects to Southbridge 1935 using both the Universal Serial Bus (USB) the PCI Express bus. Southbridge 1935 includes USB Controller 1940 that provides USB connectivity to devices that connect to the USB. These devices include webcam (camera) 1950, infrared (IR) receiver 1948, keyboard and trackpad 1944, and Bluetooth device 1946, which provides for wireless personal area networks (PANs). USB Controller 1940 also provides USB connectivity to other miscellaneous USB connected devices 1942, such as a mouse, removable nonvolatile storage device 1945, modems, network cards, ISDN connectors, fax, printers, USB hubs, and many other types of USB connected devices. While removable nonvolatile storage device 1945 is shown as a USB-connected device, removable nonvolatile storage device 1945 could be connected using a different interface, such as a Firewire interface, etcetera.

Wireless Local Area Network (LAN) device 1975 connects to Southbridge 1935 via the PCI or PCI Express bus 1972. LAN device 1975 typically implements one of the IEEE 802.11 standards of over-the-air modulation techniques that all use the same protocol to wirelessly communicate between information handling system 1900 and another computer system or device. Optical storage device 1990 connects to Southbridge 1935 using Serial ATA (SATA) bus 1988. Serial ATA adapters and devices communicate over a high-speed serial link. The Serial ATA bus also connects Southbridge 1935 to other forms of storage devices, such as hard disk drives. Audio circuitry 1960, such as a sound card, connects to Southbridge 1935 via bus 1958. Audio circuitry 1960 also provides functionality such as audio line-in and optical digital audio in port 1962, optical digital output and headphone jack 1964, internal speakers 1966, and internal microphone 1968. Ethernet controller 1970 connects to Southbridge 1935 using a bus, such as the PCI or PCI Express bus. Ethernet controller 1970 connects information handling system 1900 to a computer network, such as a Local Area Network (LAN), the Internet, and other public and private computer networks.

While FIG. 19 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving, by one or more processors, a first packet that includes an output offset and one or more non-zero elements each corresponding to a different one of a plurality of rows in a sparse-matrix, wherein each of the one or more non-zero elements is stored in one or more of a plurality of predefined fields included in the first packet that each correspond to one of the plurality of rows;
   computing a plurality of output values to correspond with each of the plurality of rows using one or more of the non-zero elements and one or more corresponding input values included in an input vector;
   processing the plurality of output values; and
   performing a single block write operation to store the plurality of output values in the plurality of consecutive locations using the retrieved output offset.

2. The method of claim 1
   wherein the output offset is an output vector secondary offset and corresponds to a first location of the plurality of consecutive locations.

3. The method of claim 1 wherein the sparse-matrix is partitioned into a plurality of slabs, the first packet corresponding to a first slab included in the plurality of slabs, the method further comprising:
   assigning a first one of a plurality of work unit clusters to the first slab, wherein the first work unit cluster includes a plurality of work units that are each correlated on a one-to-one basis with one of the plurality of predefined fields.

4. The method of claim 3 further comprising:
   retrieving a second packet that corresponds to the plurality of rows, the second packet including one or more different non-zero elements;
   computing a different plurality of output values using the one or more different non-zero elements and one or more corresponding different input values; and
   adding the different plurality of output values to the corresponding plurality of output values, resulting in a plurality of current output values.

5. The method of claim 4 wherein a formatted matrix data structure includes the first packet and the second packet, the method further comprising:
   retrieving a permutation array from the formatted matrix data structure, wherein the permutation array identifies an order to arrange the plurality of current output values;
   arranging the plurality of current output values according to the permutation array; and
   storing the arranged plurality of current output values in an output vector.

6. The method of claim 5 further comprising:
   assigning each one of the plurality of work unit clusters to a different one of the plurality of slabs; and
   for each one of the plurality of work unit clusters, computing a different plurality of current output values that each correspond to a subset of the output vector.

7. The method of claim 1 further comprising:
   retrieving an input vector offset from the first packet;
   identifying one or more input vector addresses for which to retrieve the one or more corresponding input values from the input vector based upon the input vector offset and which of the one or more predefined fields include the one or more non-zero elements; and retrieving the one or more corresponding input values from the identified one or more input vector addresses.

* * * * *